(12) United States Patent
Meyer

(10) Patent No.: US 8,130,107 B2
(45) Date of Patent: Mar. 6, 2012

(54) LEAK DETECTION AND CONTROL SYSTEM AND METHOD

(76) Inventor: Timothy Meyer, Temecula, CA (US)

(*) Notice: Subject to any disclaimer, the term of this patent is extended or adjusted under 35 U.S.C. 154(b) by 316 days.

(21) Appl. No.: 12/194,483

(22) Filed: Aug. 19, 2008

(65) Prior Publication Data
US 2010/0045471 A1   Feb. 25, 2010

(51) Int. Cl.
G01M 3/04 (2006.01)
G01M 3/18 (2006.01)

(52) U.S. Cl. ............. 340/605; 73/40; 73/46; 137/312; 251/129.11; 251/315.01; 340/870.02

(58) Field of Classification Search .............. 340/605, 340/870.02; 137/312; 251/129.11, 315.01; 73/40, 46
See application file for complete search history.

(56) References Cited

U.S. PATENT DOCUMENTS

| 4,447,793 | A  | * | 5/1984  | Gray ........................... 333/106 |
| 5,694,960 | A  | * | 12/1997 | Turk et al. ...................... 137/1 |
| 6,374,846 | B1 | * | 4/2002  | DeSmet ..................... 137/15.01 |
| 6,662,821 | B2 | * | 12/2003 | Jacobsen et al. .............. 137/312 |
| 6,967,422 | B2 | * | 11/2005 | Nelson ........................ 310/191 |
| 7,032,435 | B2 | * | 4/2006  | Hassenflug ...................... 73/46 |
| 7,317,404 | B2 | * | 1/2008  | Cumeralto et al. ...... 340/870.02 |
| 2008/0054209 | A1 | * | 3/2008 | Drinkwater et al. ..... 251/129.11 |
| 2008/0128648 | A1 | * | 6/2008 | Thomas et al. .......... 251/315.01 |

* cited by examiner

Primary Examiner — George Bugg
Assistant Examiner — Anne Lai
(74) Attorney, Agent, or Firm — James D. Leimbach

(57) ABSTRACT

A system and method for detecting leaks using sensors to report the leak and communicate with a control unit to turn off the source of the leak once detected. A valve can be turned off in the event of a leak and embodiments employing battery power can function during loss of power such as a power blackout. Wireless sensors can be employed to detect leaks that wirelessly communicate with a control and operate solely with a designated control unit. The wireless sensors can operate using low power provided by batteries. The control panel can display alarm conditions from the sensors, including: low battery, poor signal, wet sensor, communication failure, sensor failure.

20 Claims, 11 Drawing Sheets

LEAK DETECTION AND CONTROL SYSTEM AND METHOD

FIELD OF THE INVENTION

The present invention relates to detecting leaks of a substance and controlling leaks once detected, and more particularly, to detecting leaks of a substance and shutting off or turning off the supply of the substance once a leak is detected.

BACKGROUND OF THE INVENTION

In modern day society, numerous substances can be provided to either commercial or residential buildings through pipes to provide a great deal or service, convenience and comfort. Most common among these substances are water and natural gas. Leaks of these substances can result in great hardships and financial loss. Water leaks cause billions of dollars of damages every year. Gas leaks can lead to catastrophic results. Numerous methods and systems have been disclosed within the prior art to detect and control leaks for substances delivered to either commercial or residential buildings through pipes. A few of these prior art disclosures are discussed below.

US Published Patent Application No. 2006/0124171 published in the name of Ghazarian et al., (hereinafter Ghazarian et al.) describes a wireless leak detection system that is useful in preventing property damage. The figures within Ghazarian et al. show a mechanism that is capable of closing a valve; however, the valve that is a typical household valve. Ghazarian et al. alludes to a system in which battery power can be used to operate the system; but provides no teaching for a combination of elements enabling for a system that can reliably prevent leaks using only battery power. Ghazarian et al. describe a motor that closes a valve upon receiving an instruction to do so from the processor. The processor within Ghazarian et al. must count the number of turns or gear counts within the motor to provide an estimation if the valve has been closed. There is no feedback from the motor/valve combination taught by Ghazarian et al.

U.S. Pat. No. 6,892,751, issued in the name of Sanders, discloses a system and method to control a shut off the valve in order to protect a building. While the system of Sanders is useful in providing a valve shut disclosure, the teachings of Sanders fail to provide a robust system that can operate using only low power to close a valve. Additionally, the system taught by Sanders employs a switch to indicate if the valve is opened or closed does not provide any direct feedback from the valve or the motor used to close the valve.

It should be readily apparent from the foregoing discussion that problems remain within prior art systems and methods for detection and controlling the leak of a substance. There remains a need for a robust system and method that is capable of operation at all times in order to insure that damage to persons and property does not occur.

SUMMARY OF THE INVENTION

The embodiments described herein address the shortcomings within the prior art by providing a cost effective leak detection system that can detect leaks before substantial damage occurs. Additional embodiments provide sensors that can signal excessive flow in a substance.

Various embodiments are described herein including those that can detect a substance using sensors and respond to the detection of a leak to control the source of the substance to turn off if a leak is detected. Differing embodiments can detect either fluid leak (such as water) or leaks of a gaseous substance. Robust embodiments are described that can function using only battery power to close a valve and turn the valve off even during blackouts or without power from a wall outlet.

It is an object of an embodiment to provide a wireless sensor that can detect a leak of a substance and a control system that can cut off the source of the substance.

It is an object of another embodiment to provide a leak detection system having wireless sensors that can wirelessly communicate with a control unit and only operate solely with a designated control unit using signals that are approved by the FCC.

It is an object of yet another embodiment to provide wireless sensors that can operate for extended periods of time using only battery power.

It is an object of still another embodiment to provide a control panel that can be enabled to display numerous alarm conditions from a sensor unit, including: low battery, poor signal, wet sensor, communication failure, sensor failure.

An object of another embodiment is to provide a leak detection system that can identify sensor connection failure.

It is an object of another embodiment for a system that can provide alarm conditions for daily, weekly, monthly or yearly water usage exceeding a predetermined flow limit.

It is an object of another embodiment for a system that can provide alarm sensors that can detect temperature and act in response to temperatures outside of preset parameters.

It is an object of another embodiment to provide is a leak detection system having over voltage overprotection.

It is an object of another embodiment to provide a sensor within a leak detection system that employs flash memory for the storage of data within the leak detection sensors.

It is an object of another embodiment to provide a leak detection system that has extended battery life.

It is an object of another embodiment to provide a leak detection system that can operate solely using battery power to repeatedly open and close valves.

It is an object of another embodiment to provide a leak detection system with sensors that communicate with a control unit in accordance with a predetermined schedule.

It is an object of another embodiment to provide a leak detection system with sensors that can signal, wet, dry states, low battery, time, serial number, or loss of sensor connection.

It is an object of another embodiment to provide a leak detection system that can identify a failure of sensor to communicate with a control unit and set off an alarm.

It is an object of another embodiment to provide a leak detection system that utilizes a sleep mode for at least a portion of the system to conserve power and circuitry that can initiate a wake up of that portion of the system.

It is an object of another embodiment to provide a sensor within leak detection system that utilizes a sleep mode to conserve power and a wake up function of the sensor during predetermined time intervals.

It is an object of another embodiment to provide a leak detection system with visual and/or audio confirmation of sensor tests.

It is an object of another embodiment to provide a leak detection system with capabilities for visual and/or audio confirmation of: successful programming; addition or deletion of sensors; or the addition/deletion of service reminders on the control panel.

It is an object of another embodiment to provide a leak detection system that will remain in program mode if no sensors have been programmed.

It is an object of another embodiment to provide a leak detection system employing a sensor with a body having predetermined size limitations.

It is an object of another embodiment to provide a leak detection system that has an internal clock.

It is an object of another embodiment to provide a leak detection system having the ability to simply and easily turn the water back on after a leak event, without incurring another leak event.

It is an object of another embodiment to provide a leak detection system with a receiver capable of displaying signal strength from the sensor during set up mode.

It is an object of another embodiment to provide a leak detection system with control panel that can an audible indication that a sensor has been programmed to alert that programming has taken place.

It is an object of another embodiment to provide a leak detection system with sensors capable of keeping time via a processor in the control unit.

It is an object of another embodiment to provide a leak detection system with a control unit that has wired inputs for sensors to enable bi-directional programming and set-up modes for sensors.

It is an object of another embodiment to provide a substance control system that is in communication with at least one flow meter that can measure flow of a substance and in accordance with predetermined parameters initiate a procedure that will either set an alarm or shut off the water based on the reading of the at least one flow meter having flows outside the set of parameters.

It is an object of another embodiment to provide a method and apparatus that correctly aligns a control valve for a substance with an actuator used to control the valve to prevent binding and ensure optimal functioning of the actuator and valve.

It is an object of another embodiment to provide a method and apparatus that controls multiple valves.

It is an object of another embodiment to provide a method and apparatus for a water control system that can run a sprinkler system to turn the sprinkler system to either a reduced rate of watering or completely off during predetermined periods such as rainy periods or periods of shorter days.

It is an object of another embodiment to provide a method and apparatus for a control system that can provide service reminders.

It is an object of another embodiment to provide a method and apparatus for a control system that can provide information related to service providers such as names and telephone numbers, email address or other contact information.

It is an object of another embodiment to provide a method and apparatus for a control system that has a control panel that can be programmed in different languages.

BRIEF DESCRIPTION OF THE DRAWINGS

FIG. 5b is an illustration of the inside of the actuator assembly shown in FIG. 5a;

DETAILED DESCRIPTION OF THE DRAWINGS

As used herein the terms "actuator" and "actuator assembly" are used interchangeably and denote an assembly that has a motor with a mechanism to apply the motors movement.

Valve as used herein denotes a mechanism that can open or close, or be used to open or close a source of a liquid or gaseous substance.

The term sensor as used herein refers to a sensor system having a mechanism to detect a substance and another mechanism to communicate detection of the substance.

The term flowmeter as used herein refers to a device that can measure the flow of a liquid or gaseous substance past a point or an area over a time period. There are different types of flow meters. Some flowmeters measure mass while other flowmeters measure volume, flowmeter as used herein refers to both.

Figure 1:
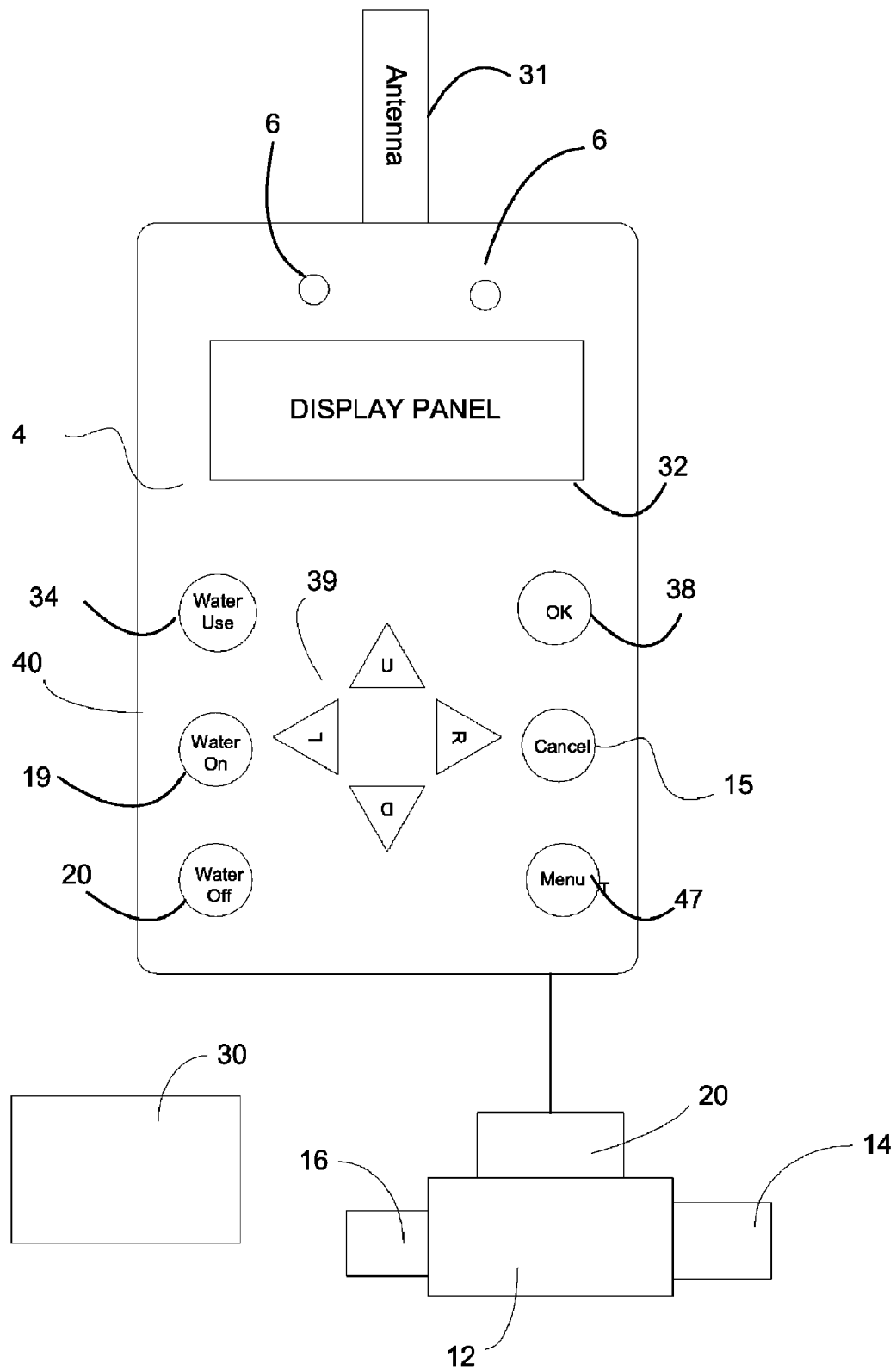
FIG. 1 is a system diagram for the components used in a leak detection and control system.

FIG. 1 illustrates the system components of an embodiment for a leak detection and control system, generally referred to as 10. The basic system includes control unit 40 with a control panel 4 that allows access for programming and controlling of system 10. System 10 has various components that interface with control unit 40, such as actuator assembly 20 used to control valve 12 that controls the flow of a substance from the intake 14 to the outtake 16. Actuator assembly 20 controls valve 12 to be either in an open or closed position. Numerous sensors 30 can be strategically located to detect the presence of the substance that passes through valve 12 and determine if control unit 40 should instruct actuator assembly 20 to close valve 12. Sensors 30 can be positioned in places that leaks could be expected to occur and interface with control unit 40 to provide status. If a sensor 30 detects a leak in the substance, then a leak status can be communicated to the control unit 40 and the control unit 40 can send a signal to actuator assembly 20 to turn off the valve 12, thus, preventing the substance from passing from the intake 14 to the outtake 16. The substance passing through valve 12 from intake 14 to outtake 16 can be either a fluid or a gaseous substance.

In an embodiment, control unit 40 is provided with control panel 4 having display panel 32 to allow for the user to program, control and select the various capabilities of the control unit 40. The display panel 32 can be constructed using LCD or other display technology. A cursor can be provided on the display panel 32 that is controllable by a cursor control device, such as directional buttons 39 to navigate items on the display panel 32. Alternatively, a trackball device or joystick device can be employed instead (or in addition to) the directional buttons 39 to navigate the display panel 32. Antenna 31 is provided to receive data from the sensors 30 and other wireless devices within the system 10, such as flow meters or sprinkler controls. Different embodiments can communicate on various frequencies. One particular embodiment is designed to communicate around a frequency of 433 MHz and envisions that antenna 31 can be designed specifically around that frequency. Other embodiments can center on different frequencies and antenna 31 can be designed these different frequencies. Antenna 31 can be either internal or external to control unit 40.

In another particular embodiment, system 10 is tailored for water control and leak detection. It should be noted that this embodiment for water and leak control is only one of many potential embodiments, and that numerous other fluid and gaseous substance embodiments are also envisioned. Accordingly, each time the term "water" is mentioned in this embodiment it should be understood that other substances can be used as the substance in place of water, including but not limited to gaseous substances and other fluid substances. The control panel 4 shown in FIG. 1 has a water on switch 18 and a water off switch 19 allowing a user to either turn valve 12 on or off, respectively. Display panel 32 provides a visual interface with the user. Menu button 47 allows activation of an internally stored menu that can be display on display panel 32. Prior programming of system 10, pressing menu button 47 will begin a program mode for control unit 40. Directional buttons 39 (U, D, L and R) control movement of a cursor on the display panel 32 in either an up (U), down (D), left (L) or right (R) direction. Commands on display panel 32 can be selected OK button 38. Cancel button 15 can prevent an action from taking place. The control unit 40 can be provided with the capability for controlling actuator 20 to open valve 12 using water on button 18 or to close valve 12 using water off button 19. LEDs 6 can also be provided to provide various indications.

The control unit 40 illustrated in FIG. 1 has a water use button 34 that can provide reports and updates on water usage. By receiving updates on the usage of water or other substance that is being controlled by system 10, conservation of that substance can be enhanced. In an embodiment, the water usage button 34 can be used to program the system 10 to either provide alerts if water usage is outside a set of parameters or completely shut the water off is water is usage is outside a set of parameters. The parameters can be programmed through the control unit 40. For example, the parameters could limit the use of a substance, such as water, within a given period of time. The time period could be a matter of minutes, hours, days or any other time period. A flowmeter can report on the amount of water usage in any given time period. For example, within a time period of 15 minutes, a predetermined number of gallons of water could be used as an upper limit for showers. The flowmeter can report to the control panel and rates of use can be compared with any preset parameters. The most common type of flowmeter for determining the rate of flow for water within a commercial or residential building would be an impeller type of device wherein the flowing water turns the impeller and the number of turns in the impeller is converted into a rate of flow. There are many types of flowmeters. Flowmeters can measure the amount of a substance that travels past a given location. By measuring the velocity of a substance over a cross sectional area, the volume of a substance (volumetric flow) passing that location can be measured. Another type of flow meter would not only take into account the volume of a substance that passes a particular location but also the density of the substance. By taking into account the density of a substance in combination with the volumetric flow, the "mass flow rate" can be determined by a flowmeter. The density of the substance and determining the mass flow rate may be important parameters to consider in embodiments where the substance being detected and controlled is gaseous.

There are numerous types of flow meters. Flowmeters can be designed in numerous ways. Flowmeters using impellers, rotary pistons or displacement meters operate on the principle of rotation within a chamber. Each rotation represents the passage of a particular of water through the chamber. Flowmeters can commonly employ gear mechanisms, magnetic drives, needles, dials and odometer type displays are common within flow meters; although, not all necessarily at the same time.

The embodiment for water control and leak detection being described can detect water leaks and close valve 12 using actuator 20 as a responsive action to signals from control unit 40. The control unit 40 can signal actuator 20 to close valve 12 in response to a water leak reported from one of the sensors 30 or in response to the user depressing the water off button 45 on the control panel 4.

Figure 2:
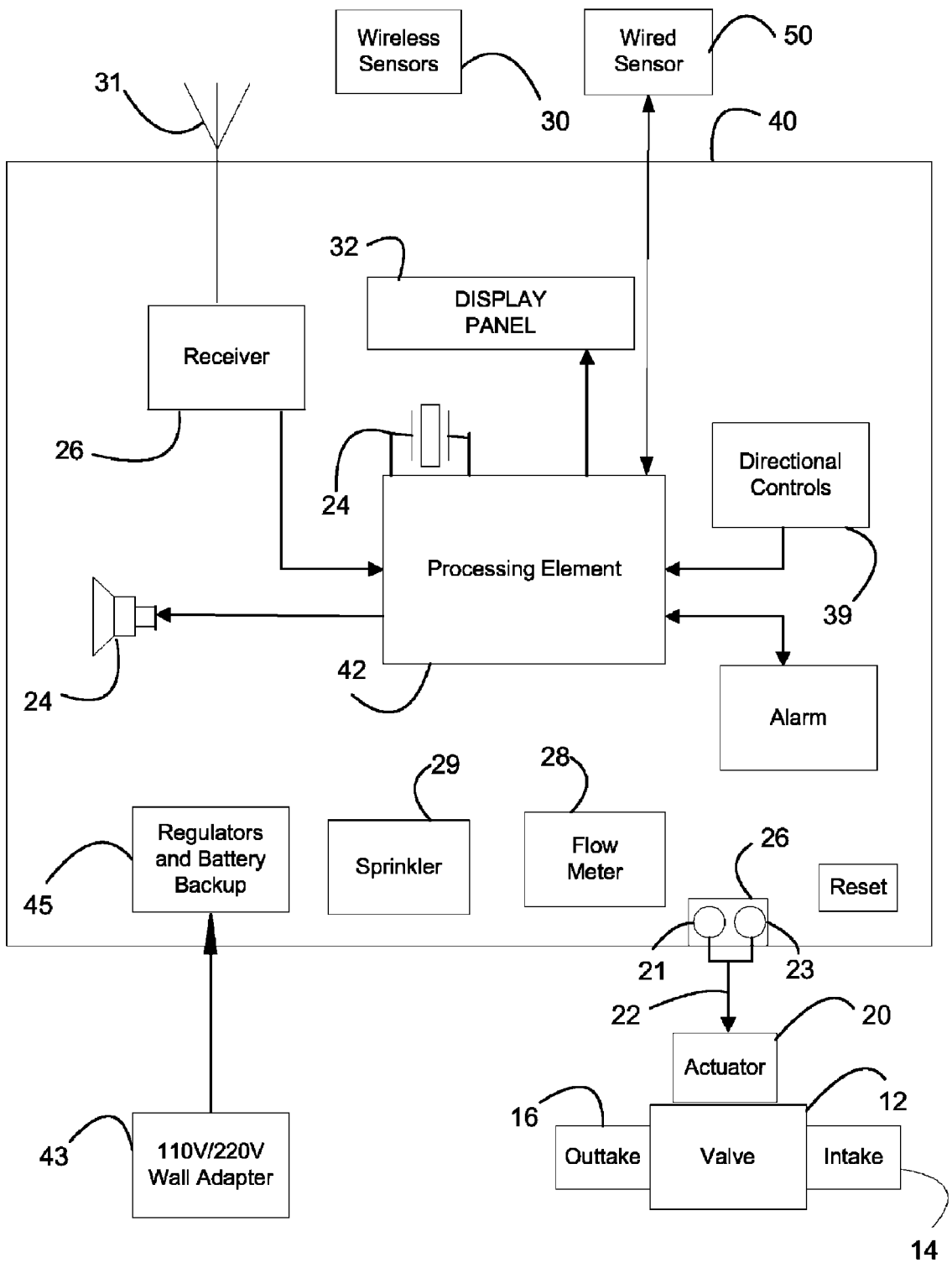
FIG. 2 is a basic block diagram for the leak detection and control system shown in FIG. 1.

FIG. 2 illustrates a functional block diagram for an embodiment of system 10. It should be noted that the functional block diagram illustrated in FIG. 2 represents a system having numerous interconnects and bus structures that interface the functions indicated by the various functional blocks. Control panel 4 is located on the front of the control unit 40 and providing various programming and control features as matter of design choice. The programming and control features for the control unit 40 as described herein can be performed by a controller or a processor that can access to memory, generally referred to herein as processing element 42.

The embodiment described as an example is a water leak detection system 10 can be installed on multiple dwellings or structures that are within range of one another. In an embodiment, sensors 30 can be programmed to be associated with a specific control unit 40 to prevent miscommunications between systems. Unique identification between sensors 30 and control units 40 allows for multiple systems 10 to be placed within radio frequency range of each other and not have the various components of one system 10 communicate with a component of another system 10. Many mechanisms exist that allow the components to be identifiable. Serial numbers can be supplied to components or other identifying indicia such as unique numbers. As used herein, the term "unique number" designates a number that employs decoding, decryption or use of at least one key to be interpreted. The term "serial number" refers to a number that is freely accessible and does not need to be decoded, decrypted or employ a key to be used. In one series of embodiments, the sensors 30 and control unit 40 that are part of the same system 10 are programmed with unique numbers to identify with each other. In another series of embodiment, the sensors 30 and the control unit 40 simply use serial numbers to identify each other.

An embodiment employs unidirectional communications between the sensor 30 and the control unit 40 to reduce system costs. An example of unidirectional communication between the sensor 30 and the control unit 40 is a wireless sensor 30 that transmits signals that are received by the control unit 40. Conventional connectors on the sensor 30 and the control unit can be used to allow for programming of the sensor 30. The connection between the control unit 40 and the sensor 30 can also provide for communication in a programming mode that will download specific information between the control unit 40 and the sensor 30 and/or upload specific information between the sensor 30 and the control unit 40. Specific information such as the serial number or unique number for the control unit 40 can be downloaded into the senor 30. Additionally, the serial number or unique number for the sensor 30 can be uploaded into the control unit 40. The programmed sensor 30 can communicate with the control unit 40 in various ways. One manner of communication is to have either serial numbers or unique number be employed so that each sensor 30 can only communicate with the control unit 40 that is associated with that particular system. In this manner, the wireless sensors 30 can be enabled to wirelessly communicate with the control unit 40 to the exclusion of all other control units that may be in the vicinity of system 10. Other embodiments may desire a less expensive approach and not use identification techniques between the sensor 30 and the control unit 40.

More sophisticated embodiments can employ bi-direction links between the control unit 40, the sensors 30 and other components such as sprinkler control and flow meters. Here, the wireless links to the control unit 40 that are bi-directional and wireless communication is used in place of the hardwired mode described above for programming and set-up purposes. In bi-directional communication embodiments, both sensors 30 and control unit 40 are equipped with transceivers allowing wireless communication to be used during initialization, set up and programming modes. In those embodiments wherein communication between the sensor 30 and the control unit 40 is bi-directional, initialization and programming can also be bi-directional allowing either serial numbers or unique numbers to be exchanged and stored into internal memory within the sensors 30 and the control unit 40. Also, in those embodiments employing bi-directional communications between the control unit 40 and the sensor 30, the control unit 40 could download a randomly generated check-in time to the sensor 30.

Memory as used herein can be any of flash memory, DRAM, non-volatile RAM, STATIC RAM, EEPROM or other type of memory. If some type of non-volatile memory is used, if a battery goes bad on either the control unit 40, one of the sensors 30, or possibly another wireless component such as a sprinkler or a flow meter, the homeowner can replace the battery and the component does not need to be reprogrammed.

An embodiment provides initialization features for the control unit 40. One such feature is to have control unit 40 remain in a program mode if no wireless sensors 30 have been programmed. This feature provides enhanced convenience because the program mode is already selected. Furthermore, this feature provides an alert mechanism to the user indicating that the system 10 has not yet been programmed.

The control unit 40 has display 32 the can be used to illustrate the signal strength of messages transmitted from the sensors 30 and detected by receiver 26 during set up mode. The control unit 40 can also be programmed to provide an indication that a sensor 30 has been successfully programmed by either an audible alert and/or a visual indication. In another embodiment, the control unit 40 is provided with a preprogrammed test mode. The preprogrammed test mode is built in to the control unit 40 and can test the correct functioning of all major functions performed by the control unit 40.

The display panel 32 on the control panel 4 can be an LCD display. The most common LCD displays are transmissive employing a backlight to provide illumination in dark conditions. Embodiments concerned with power consumption could provide that the backlight for a transmissive LCD display panel 32 only be turned on if activate by a button, switch or some other mechanism, or upon the occurrence of selected events. Reflective LCD technology does not require a backlight and could be used to simplify system design by not requiring a backlight that is turned on or off according to circumstances. Reflective LCD technology does not illuminate will in low light conditions and therefore, may not be desirable in power failure situations, but still remains a design option. Organic Light Emitting Diode (OLED) technology provides similar or better characteristics as a transmissive LCD without using a backlight. OLED based display can be used for low power consideration due its inherent illumination properties. OLED is a recent technology that has not yet matured and as a result OLED display panels are expensive. As future OLED systems are designed this technology will become more economical and robust.

In another embodiment, the control panel 4 will have use an LCD screen with 16-20 characters×2 lines for display panel 32.

Embodiments for the control unit 40 can provide visual confirmation of tests that are run on sensor 30 through specific words, symbols, pictures, icons or characters on the display 32. The display 32 can also provide visual confirmation of the successful programming, deletion of sensors, addition of sensors, and/or the addition or deletion of service reminders at the panel to the control unit 40. The display panel 32 can be used to provide a summary of programmed zones and sensors within the system 10.

The control unit 40 can optionally be programmed to provide: the name and phone number of a service person or company, service dates or intervals; or service events which can be either recurring or non-recurring. Different embodiments can use various combinations of service events. For example, one type of service event could be to add salt for a water softener that can be determined over a period of time or in accordance with the amount of water used by the softener as determined by a flow meter or other type of sensor associated with the softener. Another type of service event could be to change the filter within a filtering system that provides drinking water that could be determined over a predetermined period of time or in accordance with the amount of water used by the filtering system as determined by a flow meter or other type of sensor. Service events do not have to be related to water or fluids. An air purification system can also have service events such as requiring a filter change periodically. Dehumidifiers and humidifiers can require filter changing or cleaning.

In an embodiment, the control panel 4 allows for programming of the system 10. One of the items that can be programmed is a menu of zone locations for the sensors 30 that are associated with a particular system 10. A menu of zone location can include, but not necessarily be limited to names such as: hot water heater; laundry room; ice maker; dishwasher; kitchen sink; water purification system; master bathroom; master bath sink; guest bathroom; guest bath sink; kids bath room number 1, 2, 3, 4 etc.; kids bath sink number 1, 2, 3, 4, etc.; basement; sump pump; water softener; wet bar or wine bar. The programming can identify zone locations by name, number, alphanumeric characters or iconic representations to make it easy for the user to know which zone is being programmed.

In another embodiment, alarm states can exist within system 10 for any of several reasons. If one of the sensors 30 detects wetness, a Wet Sensor alarm can be set. The Wet Sensor alarm can be audible and/or visual. The Wet Sensor alarm can be used to have the control unit 40 turn off the valve 12 to prevent the accumulation of water. Differing embodiments can provide varying types of indications on the control panel to illustrate the specific zone that is reporting as wet, such as a zone number, zone name or iconic messages such as a toilet icon, a sink icon a refrigerator icon. These messages can be audio such as a buzzer or a voice message stating that a leak has been detected in a particular area.

Another embodiment can report a Low Battery state for a sensor 30 or another component within a system 10 that uses batteries. Any flow meters that are associated with the system 10 could be run on battery power and have wireless communications to the control unit 40 that could report status, including battery voltage, to the control unit. A state of Low Backup Battery can also be reported for the control unit 40 if non-rechargeable batteries are being used in the control unit 40.

Differing embodiments can employ varying types of communications between the control unit 40 and sensors 30 or other components in communication with the control unit such as flow meters or sprinkler controls. Communications can be arranged to be wireless, wired or a combination of both. A communication failure state can be set if a sensor 30 does not check in within a specific period of time. A communication failure state can also be set if a flow meter does not appear to be communicating properly with the control unit 40.

One particular embodiment will provide a master reset for the control unit 40. Activation of the master reset will place internal memory within the control unit 40 into a start up condition. The start-up condition would typically be a previously programmed state (although it could also be an unprogrammed state) and memory used to store important data on the control unit 40 would be loaded with the desired start-up data. Another embodiment will provide voltage overprotection for the control unit 40 and an internal memory that can record system data, such as that for the sensors, and other components of the system.

In another embodiment, the control unit 40 will provide the functionality to output a signal for at least one relay that controls an alarm and/or output a signal to at least one relay for activating an auto dialer.

Another embodiment provides an internal speaker 24 within the control unit 40. The speaker 24 can provide audible alerts during alarm states. A leak can be used to sound an audible alarm. Also, a failure of a sensor 30 to communicate with the control panel can also be used to enter an alarm state. One or several buttons on the control panel to the control unit can be used to silence that alarm. The speaker 24 can be used to provide for audio confirmation of tests performed on sensors 30, audio confirmation of successful programming, deleting of sensors 30, adding of sensors 30, or the addition/deletion of service reminders within the control unit 40.

Control unit 40 can be provided with a built in tests for hardware, software, sensors 30 or associated components such as valve 12. An embodiment provides for programmability of the control unit 40 to periodically actuate the valve 12 on a routine basis. One embodiment employs a valve 12 that can close by turning the valve 90° (¼ turn) and can actuate valve 12 to partially close by 45° every X number days. Here X can be variable and is chosen to prevent deposits from building up inside the valve 12. This versatility is useful in areas that have heavy water and may desire to perform some type of preventative maintenance to prevent deposits from building up inside valve 12. By periodically closing (or partially closing) valve 12 and then reopening valve 12 these deposits can be prevented. Areas having softer water could choose to operate valve 12 to open and close it on a less frequent basis than those areas that have harder water.

Embodiments can provide control unit 40 with the functionality to close the valve 12 in response to a leak message being received from one of the sensors 30. Embodiments can also provide the functionality to operate valve 12 from the control panel 4 of the control unit 40. The water off button 45 and water on button 19 on the control panel 4 for the control unit 40 can be activated to respectively close and open valve 12. The appliance, toilet or other device responsible for the leak can have the water to that device turned off, stopping the leak. Once the source of a leak is corrected, the water can simply and easily be turned on from the control unit 40. Thus control unit 40 can turn the water back on after a leak event, without incurring another leak event.

The control unit 40 can have terminals or other electrical connection to serve as an input for wires from the actuator 20. The wires from the actuator 20 can be polarized such that are attached to specific terminals on the control unit 40. Silk screens near the terminals and various keying techniques can be used to insure the correct connection. Circuitry on the control unit 40 can also be employed to detect if the wires from the actuator 20 are connected to the correct terminal.

An embodiment provides electrical connection between the control unit 40 and the actuator 20 using two shielded wires 22. The two shielded wires 22 are connected to a valve control section 26 within the control unit 40. The two shielded wires 22 represent the polarity of the actuator and allow for the control unit 40 to know the current position of the actuator 20 and, therefore, the status of the valve 12 as being either opened or closed. For example, color coding the shielded wires 22 so that the negative terminal 21 on valve control section 26 within the control unit 40 is attached to a red wire from the actuator 20; and the positive terminal 23 on valve control section 26 is attached to a black wire from actuator 20, provides a predetermined polarity connection between the control unit 40 and the actuator 20. The connecting of color coded shield wires 22 to their respective negative and positive 21, 23 terminals on the control unit 40, allows the control unit 40 to know the polarity of the actuator 20. By knowing the polarity, the control unit 40 can determine if valve 12 is in an opened or closed position. Additionally, the control unit 40 can be designed to prevent incorrect connection of these shielded wires by alerting the user if the actuator 20 was connected incorrectly. An alert can take the form of an audible sound from speaker 24, flashing of an LED 6, a message on the display panel 32 or a combination of the foregoing.

An embodiment employs a DC motor within actuator 20 to operate valve 12. Various DC motors can be employed within actuator 20 with the selection being at least partially dependent upon that amount of torque required to close valve 12. DC motors that operate on 3, 6 or 9 volts can use battery power alone to open or close a low-torque valve 12. The batteries that supply power for the DC motor can either provide a back-up source of power for the control unit 40 or a primary source of power depending on the specific designs for particular embodiments.

Figure 3:
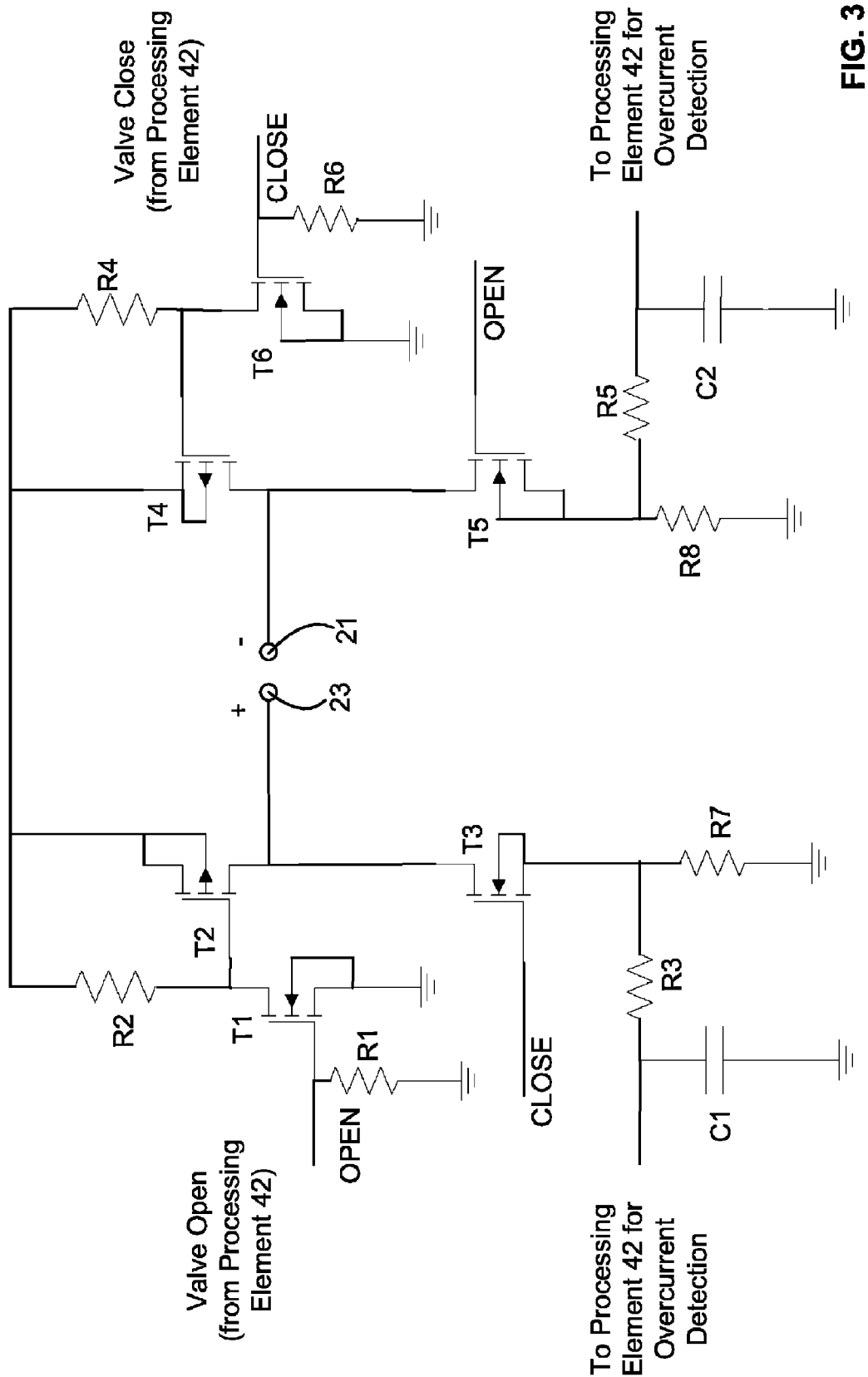
FIG. 3 is a schematic diagram for an embodiment of valve control.

FIG. 3 is a schematic diagram of for an embodiment of the valve control section 26. It should be noted that various circuits can be used for valve control section 26 and that this specific design is an example. The two shielded wires 22 are attached to negative terminal 21 and positive terminal 23 within the valve control section 26 of control unit 40. The two shielded wires 22 connect the circuitry in the valve control section 26 to the valve 12. Depending on the polarity that is applied to terminals 21,23 and thereby to actuator 20, the valve 12 either opens or closes. Normally, both the Open and Close inputs are driven low by processing element 42. Each of the Open and Close inputs from processing element 42 are placed on the gates of transistors T1 and T6, respectively. Transistors T1 and T6 are n-channel, enhancement-mode MOSFETs, therefore the normally low state on these inputs prevent transistors T1 and T6 from conducting. Each of the Open and Close inputs are further biased to ground through resistors R1 and R6, respectively, assisting with over voltage protection for these inputs. To open valve 12, the processing element 42 places a logical high signal onto the Open input that causes transistor T1 to conduct that forces the gate to transistor T2 to a logic low level. Transistor T2 is also an enhancement-mode MOSFET, but is of the p-channel type, therefore the logic low level at the gate of transistor T2 causes transistor T2 to conduct. Once transistor T2 conducts, the positive terminal 23 is placed at a logic high level. The Open input is also applied to the gate of transistor T5 which is another enhancement mode, n-channel MOSFET. The logic high level on the gate of transistor T5 turns on that transistor insuring the negative terminal 21 is at a logic low level.

Note that the circuitry illustrated in FIG. 3 for closing valve 12 is a mirror image of that used for opening valve 12 with the difference being that the Open and Close inputs from processing element 42 are reversed. Therefore, to close valve 12 the processing element 42 places a logical high signal onto the Close input that causes transistor T6 to conduct and force the gate of transistor T4 to a logic low level. Transistor T4 is also an enhancement-mode MOSFET, but is of the p-channel type, therefore the logic low level at the gate of transistor T4 causes transistor T4 to conduct. Once transistor T4 conducts, the negative terminal 21 is placed at a logic high level. The Close input is also applied to the gate of transistor T3 which is another enhancement mode, n-channel MOSFET. The logic high level on the gate of transistor T3 turns on that transistor insuring the positive terminal 23 is placed at a logic low level.

In another embodiment, valve control section 26 does not use transistors T1, T2, T3, T4, T5 or T6. The Open input from the processing element 42 can control the positive terminal 23 by having VCOM provide drive through resistor R2. The processing element 42 could place a logic low level on positive terminal 23 and be biased to ground through resistor R1 to provide necessary current sink capabilities. A similar arrangement can be used for the Close input to control the negative terminal 21 by having VCOM provide drive through resistor R4. The processing element 42 can place a logic low level on positive terminal 21 and be biased to ground through resistor R6 to provide necessary current sink capabilities.

In another embodiment, the actuator 20 that opens and closes valve 12 will contain mechanical stops to force the actuator 20 to exhibit an over current condition once valve 12 has completed opening or closing. This over current condition can be used to alert processing element 42 within system 10 that opening or closing of the valve 12 has completed. The processing element 42 can then stop driving the Open or Close inputs once the valve 12 has completed opening or closing. The over current condition can be detected by processing elements. For example, transistor T3 shown in FIG. 3 is an n-channel, enhancement mode MOSFET. The Close signal is applied to the gate of transistor T3. Once the Close signal goes to a logic high level, transistor T3 turns on forcing the positive terminal 23 to a logic low. As previously discussed, the Close signal turns transistor T6 on that applies a logic high level to the gate of transistor T4 turning transistor T4 on forcing the negative terminal 21 to a logic high level. With the positive terminal 23 low and the negative terminal 21 high, the actuator 20 closes the valve 12. Once the valve 12 is closed, the actuator 20 reaches an over current condition. The source of transistor T3 is connected to ground through resistor R7, which has a low resistance. The source of transistor T3 is also connector to an input on the processing unit 42 through resistor R3. Once the actuator 20 reaches an over current condition, the current through the source of transistor T3 becomes much larger and this increase in current is detected by the processing element 42. A capacitor C1 can be used to provide for filtering of high frequency and spurious spikes in the input from resistor R3 to the processing element 42. A similar circuit provides for over current detection for processing element 42 while opening valve 12 using the source of T5 to place the negative terminal 21 at a logic low value, and resistor R5 isolate the connection with the over current detection input to the processing element 42 and capacitor C2 providing filtering of that input.

In another embodiment the Open signal is applied directly to the gate of transistor T2 and a high level at that gate will turn on transistor T2 placing positive terminal 23 at a logic high level. In this embodiment transistor T1 can be eliminated. A similar arrangement can be used with the Close signal applied directly to the gate of transistor T4 and a high level at that gate will turn on transistor T4 placing negative terminal 21 at a logic high level.

Various circuits are known within the prior art that can be used to detect an over current condition.

In another embodiment, the processing elements will set a timer once the Open or Close signal is activated (set to a logic high level) and if the over current detection is not observed within a period of time the Open of Close signal will be turned off (set to a logic low level) and error reported.

In another embodiment, over current condition within the actuator 20 is turned off quickly, less than about a second to prevent damage to the actuator 20.

The foregoing embodiments of the valve control section 26 are merely examples. Other embodiments not using MOSFET transistors or enhancement mode MOSFET transistors are also envisioned. Circuits using bipolar or FET transistors can also be created that will perform the basic functions illustrated by the foregoing examples.

FIG. 3 illustrates enhancement mode MOSFET transistors performing the functions of controlling the polarity of terminals 21, 23. It should be noted that other MOSFET devices can also be employed for these functions and that the circuit shown in FIG. 3 will vary accordingly. Furthermore, the transistors shown in FIG. 3 do not have to be MOSFET devices and other technologies can be employed for the transistor circuit illustrated in FIG. 3 as long as the overall functionality of controlling the polarity on terminals 21, 23 is maintained. FIG. 3 also illustrates valve control section 26 being implemented using discrete components. Additional embodiments can place the functions performed by those components illustrated in FIG. 3 into programmable devices such as application specific integrated circuits (ASIC) or field programmable gate arrays (FPGA). It should be noted that the functions performed by the MOSFET transistors and associated components can be formed in CMOS devices. For example, the configuration of T2 and T3, or transistors T4 and T5 illustrate a standard CMOS configuration with adjacent n-channel and p-channel MOSFET devices. Also, a CMOS device (such as an ASIC device FPGA) can be employed that has a mixed signal implementation (analog and digital) to accommodate the various features illustrated in FIG. 3 and discussed above.

FIG. 3 is an example circuit for use with an actuator 20 and for controlling the polarity of terminals 21, 23. Other actuators having different control requirement are also envisioned.

In another embodiment, the control unit 40 operates the valve 12 periodically. Periodic operation of the valve 12 prevents calcification within the valve 12. Furthermore, periodic operation of the valve 12 serves to prevent bacteria built up and test the seals within the valve 12 for proper functioning. In one embodiment, the valve 12 will be operated once a day for 20 seconds. It should be noted that numerous variations for the periodic operation of the valve 12 can be employed and that these variations are within the scope of this embodiment. The operation of valve 12 can occur on a periodic basis within many embodiments. The valve 12 can also be operated at specific times such as on system initialization or on routine checks. The periodic operation of valve 12 can be practiced using numerous time arrangements in accordance with differing embodiments. The valve 12 could be operated at specific times such as on system initialization or on routine checks.

A specified parameter or set of parameters can be used to verify that valve 12 opens or closes properly. Detecting that valve 12 opens or closes outside a parameter can be used to set a state of Valve Failure. Using a time range for opening or closing of valve 12 can provide a parameter to ensure proper functioning of valve 12 and actuator 20. This range of time can provide a parameter that should not be exceeded by a properly functioning combination of valve 12 and actuator 20.

Embodiments employing a mechanical stop on the actuator 20 to indicate that the valve 12 is either fully open or fully closed can be implemented.

An actuator 20 with a large mechanical advantage can be used to open or close the valve 12. A high gear ratio in the actuator can provide the large mechanical advantage to open or close valve 12 over a period of time. The implementation of a low-torque ball valve 12 with an actuator 20 that has a large mechanical advantage results in an embodiment that can successfully open or close valve 12 repeatedly using only battery power. Embodiments employing a mechanical stop on the actuator 20 can be implemented to indicate that the valve 12 is either fully open or fully closed.

The valve 12 can be a full-bore valve that requires very low torque to operate creating a system that can function using only low power. An example of a suitable low-torque ball valve is the R/W532S manufactured by VIR, Inc. of Milan Italy. The R/W532S is a full bore, 1" valve configuration that can be opened or closed using only 4 inch-pounds of torque in normal situations for internal pressure under less than 100 psi. In worst case scenarios with internal pressure of up to 150 psi, the amount of torque required to operate the R/W532S would still be no more than 10 inch-pounds of torque. Employing a valve 12 that can operate under a pressure of 150 psi using only 10 inch pounds of torque directly addresses many shortcomings found within the prior art. A low torque valve 12 is useful for situations in which only low power is available, such as those using batteries, and still operating under high pressure. The provision of battery power, at least as a back up power source, provides for a robust design for system 10. Back up battery power provides a reliable system 10 that is not subject to failure even in the event of power blackouts. Additionally, the R/W532S as valve 12 provides a low duty cycle and a consistent 90° actuation that are characteristics useful in a water leak detection and control system. It should be noted that using the R/W532S by VIR, Inc. as valve 12 is an only one example of a valve that can be closed by an actuator 20 without requiring large amounts of power. Additional embodiments using other low torque valves are also envisioned.

Another embodiment employs an actuator 20 with a high gear ratio to operate valve 12 using only low power. The 50709 actuator, available from Seitz Corporation, is an example of an actuator that can operate using low power. The 50709 actuator from Seitz Corporation can close a low-toque valve 12 (such as the R/W532S by VIR, Inc. previously described) using only 6 volts of battery power. Thus, the use of the 50709 actuator from Seitz Corporation in combination with a low-torque ball valve 12 provides a system 10 that can use battery power alone to operate actuator 20 to close (or open) the valve 12. The overall gear ratio for the 50709 actuator from Seitz Corporation is about 932 to 1. The load speed of 50709 actuator from Seitz Corporation is rated at 2.4 rpm; which means that the 50709 actuator from Seitz Corporation can turn 90° (¼ turn) in less than 10 seconds. Using a low torque valve 12, similar to the R/W532S manufactured by VIR, Inc. of Milan Italy, in combination with a high gear ratio actuator, similar to the 50709 actuator from Seitz Corporation, results in a design that requires very little power to operate. In an embodiment using the R/W532S manufactured by VIR, Inc. with the 50709 actuator from Seitz Corporation, only 4 inch-pounds of torque will typically be required to operate the low torque valve 12 and 10 inch-pounds of torque under extreme conditions.

Figure 5A:
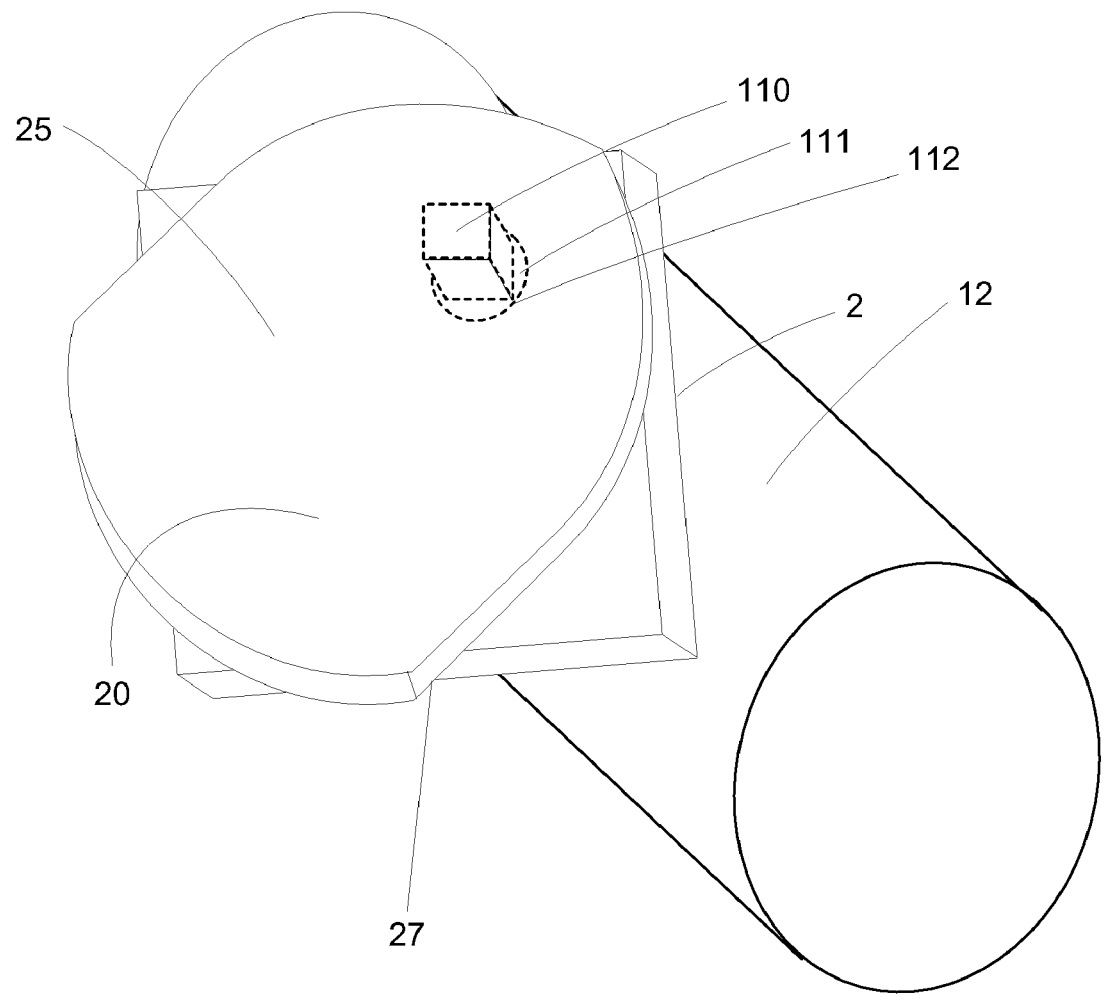
FIG. 5a is an illustration of an actuator assembly held in position next to a valve by a plate.

FIG. 5A illustrates an embodiment having an actuator 20 that is held in an aligned positioned to a valve 12 by positioning mechanism 2. The actuator 20 is an assembly that has a top portion 25 and a bottom portion 27. The valve 12 has a rotatable portion 111 (shown by as a dotted line because it is hidden from view under actuator 20) that is turned to either open or close valve 12. The rotatable portion 111 has a rectangular protrusion 110 that acts as a handle to open and close valve 12. An aperture 112 is formed in positioning mechanism 2 to be of a similar size and shape such that rotatable portion 111 will fit through or into aperture 112. The aperture 112 shown in FIG. 5A is round, other shapes and sizes can be used within differing embodiment. The rectangular protrusion 110 can engage a mating aperture formed as part of an actuator assembly to turn the rotatable portion 111 of the valve 12.

The positioning mechanism 2 illustrated in FIG. 5A is fixedly attached to both the valve 12 and the actuator 20. Positioning mechanism 2 enables proper alignment of the actuator 20 to the valve 12 while holds the assembly shown in FIG. 5A fixedly together as a single assembly. The positioning mechanism 2 illustrated in FIG. 5A is essentially a plate like device that is formed to attach to each the actuator assembly 20 and the valve 12. The positioning mechanism 2 ensures proper alignment between the actuator assembly 20 and the valve 12. Proper alignment between the actuator assembly 20 and the valve 12 allows the torque-force that is being asserted by the actuator assembly 20 on the valve 12 to be directly implemented without a significant loss of force. Although the positioning mechanism 2 is fixedly held in place, it can also removable by using attachment mechanisms that can be removed at least in a part. The positioning mechanism 2 has attaching mechanisms (not shown) for fixed attachment to each the actuator assembly 20 and the valve 12. The attaching mechanisms can be varied and include but are not limited to screws, bolts, rivets, spring like devices and clip like devices. Glues and epoxies can also be used. In one particular embodiment, the attaching mechanism for attaching the positioning mechanism 2 to the valve 12 can be a plurality of threaded devices (not shown). These threaded devices hold the positioning mechanism 2 in a fixedly attached arrangement with the valve. Another plurality of thread devices can hold the actuator assembly 20 in fixedly attached arrangement to the positioning mechanism 2. In the event that actuator 20 was to fail, the actuator assembly 20 can be removed from the positioning mechanism 2 allowing access to the rotatable portion on valve 12 that turns to open and close the valve 12; thus, providing a failsafe mechanism for system 10. The positioning mechanism 2 can be removed from the valve 12 to provide access to the rotatable portion 111 to allow the valve to be opened or closed if the actuator assembly 20 fails.

Figure 5B:
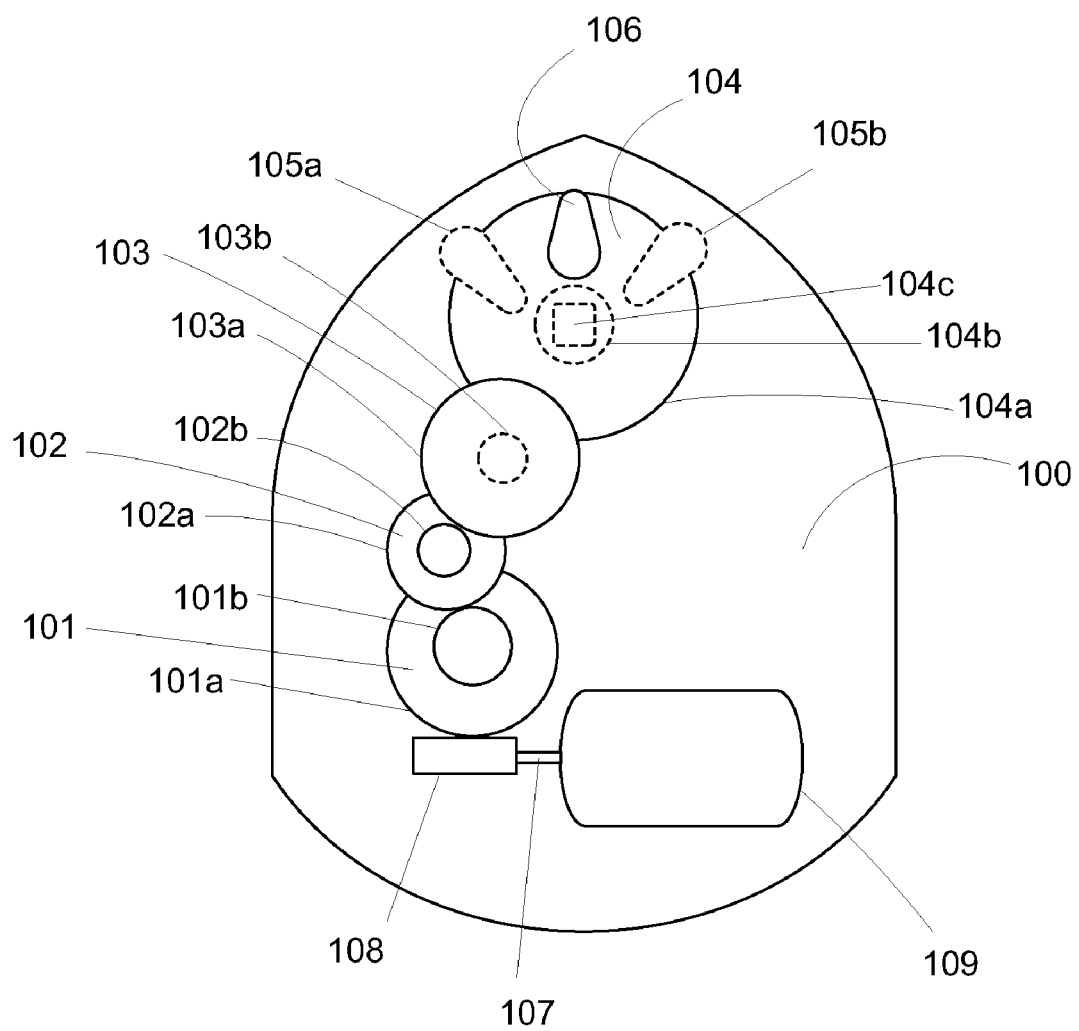

FIG. 5B illustrates the basic workings 100 of an actuator assembly 20 as shown in FIG. 5A having a high gear ratio similar to the 50709 actuator available from Seitz Corporation. The workings 100 include a motor 109 that drives a threaded portion 108 through shaft 107. The threaded portion 109 drives a gear 101a formed on a larger diameter out surface of a rotating member 101 that causes gear 101b formed on a smaller diameter of the same rotating member 101 to turn. The turning of gear 101b causes gear 102a formed on a larger diameter of rotating member 102 to turn resulting in gear 102b formed on a smaller diameter of the same rotating member 102 to turn. The movement of gear 102b causes gear 103a formed on a larger diameter of rotating member 103 to turn resulting in the turning of 103b formed on a smaller diameter of the same rotating member 103 to turn. Note that 103b is illustrated as a dotted line in FIG. 5B because it is formed beneath gear 103a as shown and, therefore, not visible. The movement of gear 103b causes 104a which is a geared mechanism formed on a larger diameter of rotating member 104 to turn. Cylindrical protrusion 104b is formed below gear 104a on the same rotating member 104 and, therefore, not visible and shown as a dotted line. An aperture 104c (also not visible and shown as a dotted line) is defined within cylindrical protrusion 104b and functions as a female member that mates with the protrusion 110 (which functions as a male member) on rotatable portion 111 of valve 12.

A linkage is formed by the protrusion 110 on portion 111 of valve 12 passing through aperture 112 within the positioning mechanism 2 and into aperture 104c. This linkage is held in position by the fixed attachment of positioning mechanism 2 to both the actuator assembly 20 and the valve 12 keeping the actuator 20 properly aligned with the valve 12. The positioning mechanism 2 forms a linkage that retains the optimum alignment of the actuator 20 to the valve 12 thus reducing any slack and lateral movement in the application of torque force applied by the actuator 20. Optimum alignment in the application of force greatly increases the efficiency of the system. Furthermore, binding can result from any slack that exist within the linkage while attempting to turn rotatable portion 111 on valve 12. It would be more difficult for the actuator 20 to turn to turn rotatable portion 111 on valve 12 if these two pieces were not optimally aligned. The use of positioning mechanism 2 assists in creating a linkage without slack enabling a robust system 10 that can reliably operate using low power because there is no binding in the linkage to overcome. The torque force supplied by the actuator 20 is directly applied to the rotatable portion 111 on valve 12 and the system 10 does not have to overcome any slack or slippage between the actuator 20 and the rotatable portion 111 on valve 12.

Still referring to FIG. 5B, the actuator 20 shown is similar to the 50709 actuator from Seitz Corporation and also provides a mechanical stop mechanism. Once encountered, the mechanical stop mechanism creates a voltage spike that causes actuator 20 to essentially stall out and stop. The mechanical stop mechanism is illustrated in FIG. 5B with armature 106 formed on the same rotating member 104 as gear 104a. Armatures 105a and 105b are formed on the top 25 of the actuator. In FIG. 5b, armatures 105a and 105b are located in the positions illustrated when top 25 is in place on the actuator 20; therefore, armatures 105a and 105b are shown as dotted lines. During normal operation, armature 106 will move approximately 90° between armatures 105a and 105b. Armatures 105a and 105b function as mechanical stops. The 50709 actuator from Seitz Corporation will stall at 49.8 inch-pounds of torque and the stall results in an increased amount of current usage allowing for detection of the occurrence of a stall. These stall characteristics allow embodiments that can effectively operate a 1" full bore valve using only 4 inch-pounds of torque to open or close valve 12. It should be noted that the foregoing embodiment using the 50709 from Seitz Corporation for actuator 20 and the R/W532S manufactured by VIR, Inc. as low torque valve 12 are only examples that illustrate an effective operation of a 1", full bore valve using low amounts of torque. Various embodiments can provide differing mechanisms for mechanical stops that will create stalls that can be detected. Other combinations of valves and actuators can be employed that will provide the same or similar results and this embodiment is simply an example for illustrative purposes.

The control unit 40 can be provided with wired and/or wireless interfaces to other components. A wired interface can be provided within the control unit 40 for one or more sensors. Wired or wireless interfaces can be provided on the control unit 40 for one or more flow meters to track the rate of water usage. Additionally, wired or wireless interface can be provided for a sprinkler system.

Another embodiment incorporates the functionality of a flow meter into the control unit 40 to monitor overall water usage. A flow meter can be configured to observe the flow of a substance through valve 12 and report the results into flow meter input 28 of the control unit. The flow meter input 28 can be a wired or wireless interface to a flow meter. The flow meter will observe through a conduit, such as the flow from intake 14 through valve 12 to outtake 16 and compare that flow with a range of acceptable levels that are determined by the control unit 40. The processor 42 will compare flow rates against parameters within memory for allowed flow rates. If these parameters are not met or exceeded, then an alarm state can be initiated and/or the conduit can be shut off. Embodiments are envisioned wherein specific actions to be taken can be programmed using the control unit 40 or other device such as a remote control (not shown). Also, embodiments are envisioned wherein the exact values for parameters, such as flow amounts, can be programmable.

An example for the flow meter input 28 resulting in a specific action would be a toilet that is running due to a misalignment of the interior bulb and hence constantly attempting to fill the toilet bowl. The amount of water that is being consumed would accumulate with a constantly running toilet. The flow meter could be on the main water line to the facility where the toilet is located or the flow meter could be on the line to the toilet itself. Once the parameter for total water usage set in the control unit is exceeded, a signal could be sent to turn off the water supply and set an alarm. The user could then take appropriate action such as repair the runny toilet or simply rest the system and turn the water supply back on. At least the user would then be aware of the amount of water usage and also be aware that the runny toilet is the cause. It should be noted that flow meters for gaseous substances can also be employed and that embodiments that discuss water leak detection and correction can also be applied to gas leak detection and correction using an appropriate sensor.

Another embodiment provides a sprinkler input 29 that can be monitored via the control unit 40. The sprinkler input 29 can monitor water usage to detect a valve break resulting in excess water usage. Sprinkler input 29 can be a wired or wireless interface with an external sprinkler system allowing the control unit 40 to monitor the external sprinkler system for leaks or other problems such as a sprinkler system not turning on. Monitoring can be set up to monitor the total amount of water that passes a given point within a certain period of time or a rate of flow that is greater or less than a predetermined amount. Sprinkler input 29 can also function to control a sprinkler system by allowing the system to be turned on or off. Water flow through a sprinkler system can be monitored and controlled by the control unit 40. The amount of time a sprinkler system is turned on can be controlled through the control unit 40. A moisture sensor could be set up to the sprinkler input 29 and the sprinkler system only turn on if the moisture sensor is dry. This type of system can result in a large savings of water over extended periods of time.

In an embodiment, the temperature for areas that are part of system 10 can be measured. Temperature sensors can be associated with sensors 30 and/or control unit 40 to provide an indication that valve 12 should be closed if the ambient temperature falls outside a temperature range. The electronics to sensors 30 and control unit 40 can be designed to operate in a range of −40° to 135° F.; which allows for the system to operate below freezing. The addition of temperature sensors within system 10 provides the ability to turn water off in the event that ambient temperature falls below a threshold that is seen as endangering pipes. Temperature sensors can be provided either inside the control unit 40, located locally or located remotely from the control unit 40 and interface with the control unit 40 either through wired or wireless communications.

An embodiment for the control unit 40 employs a microcontroller from the MSP430 family produced by Texas Instruments® as processing element 42. Within the MSP430 family of microcontrollers, the MSP430F133 is a microcontroller that can be used as processing element 42. The MSP430F133 provides 8K bytes of internal flash memory. The MSP430F133 is also pin for pin compatible with MSP430F135 that has 16 Kbytes of flash memory and the MSP430F147 that has 32K bytes of flash memory, making eventual upgrades with devices that have additional flash memory a relatively easy task. The MSP430F133 has 48 general-purpose, input/output pins (GPIO) useful in interfacing components within the control unit 40 to the processing element 42. For example, in an embodiment having display panel 32 made using LCD technology, an LCD controller alone would require 11 GPIO for data and control signals. It is also envisioned that a selection of processing element 42 from the MSP430 family can be made using a microcontroller with less capabilities and that are less expensive can be employed. The MSP430F123 and controllers lower in the MSP430 line of microcontrollers, while not pin for pin compatible with the MSP430F133, the MSP430F135 or the MSP430F147; it is envisioned that these as well as numerous types of controllers, microcontrollers and microprocessors can function as processing element 42. Processing element 42 as used herein relates to controllers, microcontroller, microprocessors or general purpose processing elements. The discussion of the MSP430 family of controllers should not be viewed as limiting the vast multitude of controllers, microcontroller, microprocessors or general purpose processors that can be employed as processing element 42. The MSP430 family provides microcontrollers that have a very low standby current, therefore, consume very low power and can function well within a battery powered backup environment. While these features are desirable, they are not necessary for processing element 42 in embodiments that do not have low power modes.

In an embodiment, a crystal oscillator 24 is employed with a MSP430 family processor to yield a timer mode consuming very low power. For example, using a conventional 32.768 kHz crystal commonly found in watches, the MSP430 family of processors can perform status checks that result in a current drain of less than 200 μA using a clock generated from a resistor/capacitor circuit internal to processing element 42. Embodiments can be created using various crystals or oscillators in place of crystal oscillator 24 and either microprocessors or microcontrollers for processing element 42.

Power conserving embodiments will have processing element 42 spend most of the time in a sleep mode and provide for processing element 42 to only be active during predetermined periods. For example, processing element 42 can wake up once every second. It is practical to leave processing element 42 in a sleep mode for the majority of the time because a water leak typically takes a period of time to occur and accumulate to an extent that is detectable. Therefore, instantaneous reaction to a leak (faster than one second or a few seconds) is not necessary. It should be understood that embodiments in which the processing element 42 is in sleep mode for longer or shorter durations of time will be readily apparent to those skilled in the art and are envisioned by the embodiments disclosed herein.

Other embodiments can improve the probability of control unit 40 receiving messages transmitted from sensors 30 by transmitting the same messages several times. For example, if there is no water leak detected, sensor 30 can transmit messages periodically providing status updates to the control unit 40. Such periodic transmissions can be transmitted either once a day, at particular times in a day, several times in a day or less than once a day depending on the specific system parameters that are employed. Repeating the same message several times alleviates receiver 26 from having to properly receive single transmission.

Another embodiment will have power delivered to the control unit 40 from a plugged in power source, such as wall adapter 43. Power can be provided to control unit 40 from a wall adapter 43 that converts AC power from 110/220 volts, 50/60 Hz systems to DC power. A wall adapter 43 alleviates the need to conserve power or to use battery power. Since power consumption is not a major concern, processing element 42 and receiver 26 can be in a wake mode most or all of the time. Embodiments using a wall adapter 43 for power may still wish to provide battery back up power in the event of a loss of power from wall adapter 43. Backup power can be provided from batteries (either rechargeable or non-rechargeable batteries) to yield substantially the same DC power level. These embodiments would envision reducing the wake time of processing element 42 if the control unit 40 is switched to battery power in power failure situations or those embodiments where only battery power is available. Receiver 26 can be left in a wake mode or placed into a low power/sleep mode if power is lost.

Various embodiments can provide the control unit 40 with different standard DC voltages, such as 3, 6 or 9 volts using batteries and accept AC power from a wall receptacle. The battery DC voltage provides back up power and the AC power can be adaptable for various embodiments such as 110 and 220 volts systems, as well as 50 & 60 hertz systems.

Embodiments using a wall adapter 43 and battery back up power can place processing element 42 and/or receiver 26 in a sleep mode much of the time or implement a sleep mode only during times that power from the wall adapter 43 is lost.

Other embodiments will observe power usage in the milliamp range under certain conditions. For example, if a message is being received by receiver 26 or an LED 6 on the front panel of the control unit 40 is being illuminated, an amount of current will be required that is unusually high compared to normal use. During normal use, which is the majority of the time, receiver 26 is not receiving messages and the LED 6 is not being illuminated on the front panel. Absent a leak being detected, the amount of time spent receiving messages or illuminating an LED on the front panel of the control unit 40 is extremely small. Therefore, while power usage within the milliamp range is considered significant for a battery powered (or battery power back-up) control unit 40, the extremely small amount of time during which current in the milliamp range will be required results in little overall drain on the batteries. The use of a low torque vale 12 with a high gear ration actuator 20 accompanied with sleep modes for high current uses devices such as processing element 42 and/or receiver 26 yields embodiments that can operate on battery power alone and still perform routine maintenance for extended periods of time last over a year.

Another embodiment employs a power conserving receiver 26 in control unit 40 to receive transmissions from wireless sensors 30. The MAX1473 from Maxim® is an example of a receiver 26 having very low standby current. The MAX1473 is a CMOS superheterodyne receiver that provides excellent for Amplitude Shift Keyed Modulation (ASK) within the 315-450 MHz frequency range. The receiver 26 in a wake mode can typically consume a good deal of power as shown in Table 1 below. Therefore, placing receiver 26 in sleep mode for large amounts of time greatly enhances power conservation. In sleep mode (power down mode), the typical current drawn by a MAX1473 is typically 2.5 µA with a maximum current draw of 5.3 µA in sleep mode. The start up time for a MAX1473 receiver is 250 µsec. enabling a low power system in which receiver 26 can be in a low power mode most of the time. Only during reception does a significant power usage in the milliamp range occur, which is very infrequent.

TABLE 1

| Device | Operating Current (µA) | Sleep current (µA) | Comments |
| --- | --- | --- | --- |
| MSP430F133 | 560 | 70 | Maximum Current at 1 MHz. In sleep mode, CPU stops but peripherals are still running at 1 MHz |
| MAX1473 | 6800 | 5.3 | Maximum values at 3.3 V |
| LCM-S01602DSFB (LCD) | 3000 500 160,000 | | Logic Max LCD Drive w/10K resistor Backlight |

In Table 1 above, the MAX1473 used as receiver 26 is always on. In other embodiment, receiver 26 will enter into a sleep mode, greatly reducing the power consumption shown in Table 1.

An antenna 31 in the control unit 40 receives signals on a frequency used by the wireless components within system 10, such as wireless sensors 30. One embodiment, of antenna 31 is designed to be sensitive for the frequency employed by the sensors 30 to communicate with the control unit 40. The control unit 40 provides a mechanism between the processing element 42 and the receiver 26 to route the characters contained in any received message. The mechanism can be a Universal Asynchronous Receiver Transmitter (UART) type device, or alternatively, the mechanism could also be software that can relay information received by the receiver 26 to the processing element 42.

An embodiment will place processing element 42 (microcontroller) into a sleep mode for a majority of the time with the peripheral clock still running. A UART (or software performing a similar function) can control the transmission of characters from receiver 26 to the processing element 42. Upon the detection of characters receiver by the receiver 26, the processing element 42 will enter a wakeful mode. Within the MSP430 line of microcontrollers, the MSP430F123, the MSP430F133, the MSP430F135 and the MSP430F147 contain either a UART or circuitry that can function as a UART. Although FIG. 2 does not show a UART within processing element 42 it should be viewed as containing a UART. The receiver 26 within the control unit 40 is operatively coupled to the UART. Once the receiver 26 receives a transmission, the UART will send characters to processing element 42 which will wake up upon reception of characters from the UART. This can occur several times a day, perhaps even hundreds or thousands of times per day and the processing element 42 will remain awake for a period of time before going back to sleep. Various embodiments can employ numerous design parameters for the length of time the processing elements 42 is awake. In one particular embodiment, the processing element 42 will remain awake for about 1 msec. before going back to sleep.

If processing element 42 is not selected from the MSP430 line of microcontrollers and does not include a UART or other communication capabilities, an independent UART can be provided and that can be operatively coupled to communicate with processing element 42. It should be understood the numerous variations will be readily apparent to those skilled in the art, including using discrete UART devices with various controllers/processors and that these variations should be viewed as being within the scope of the invention. For example, embodiments without a UART can transmit data by bit banging the output. Bit-banging as used herein refers to a communications technique that uses software instead of a hardware device (such as either a UART or a shift register) to transfer data. In bit-banging, a software routine performs the function otherwise performed by a UART by employing sampling techniques at given time intervals.

In other embodiments, characters obtained by the receiver 26 can fed into a UART (or equivalent function) either on the processing element 42 or coupled to the processing element 42. As an example, a UART can be configured to receive data from the receiver at 9600 bps.

In another typical embodiment, the UART will be configured to receive data arranged as 8 data bits, no parity bits and 1 stop bit. It should be understood that the baud rate between the receiver and the UART as well as the specific configuration of data bits, stop bits, parity bits or other error correction bits are modifiable and that the specific configuration of this embodiment is simply an example. Upon receiving a data from the receiver, the UART will relay the data to the processing element 42. If the processing element 42 is in a sleep, then upon the UART receiving a character, the UART will wake up the CPU to process the received data.

The communication link should be as robust as possible. To improve the probability that messages transmitted from the sensor 30 are received correctly by the control unit 40, messages are transmitted several times. Typically, if no water leaks are detected, then a message will be sent from the sensor 30 to the control unit 40 periodically, perhaps once a day (or more or less than once a day depending on the design of the system 10 and the parameters associated with the various components that can be used from the receiver, transmitter, valve, actuator or control unit). If a leak is detected, the sensor 30 can also be programmed to send messages at predetermined intervals. These intervals would be relatively shortly spaced to insure that the control init 40 receives the message and takes appropriate action to turn off the water at least to the area for which sensor 30 has reported a leak. Different embodiments can employ various intervals including changing the intervals after a predetermined period of time to conserve power.

Another embodiment for a system 10 employs as many as thirty-two wireless sensors 30 that communicate with the same control unit 40 using the same frequency range. It will be understood by those skilled in the art increasing the sophistication level for the electronics and software used within control unit 40 that more than thirty-two sensors 30 can be used with a single control unit 40. Techniques are known that can be employed to avoid data collisions and to ensure the integrity of data received by the control unit from sensors or other elements within system 10. An additional complication is the fact that within a typical subdivision, you can have many independent systems that can potentially interfere with each other. It is easily possible to have numerous systems operating in close proximity to each other in a condominium complex of a commercial building. Each of these numerous systems can potentially have multiple sensors that operate within range of the receivers 26 in different control units 40 of various systems. For example four systems 10 can be operating within an apartment building having four apartments. The sensors 30 within each of the four systems 10 are potentially within the same frequency range of each other. Embodiments can have sensors 30 programmed to be identifiable by the control unit 40 that is part of their system 10 and operate only with only that one of the four control units 40. In one embodiment the sensors 30 will transmit the same message several times. In another embodiment, the integrity of the received data is verified using an error checking technique. An example of a suitable error checking technique would be a CRC-16 check sum added to the end of transmission. An embodiment employs a two-byte CRC-16 check sum to verify received data. There exist numerous coding and identification techniques within the prior art that can be employed to ensure that the control unit 40 correctly receives data transmitted by the sensors 30 and other elements that are part of the system 10.

To ensure that the sensors 30 are functioning, each sensor 30 transmits its status information to the host control unit 40 a predetermined number of times a day. In one embodiment the sensors 30 will each transmit status to the control unit 4 times a day. In another embodiment the sensors 30 will each transmit data to the control unit 40 only once a day. The number of times that a sensor 30 transmits status to the control unit 40 can vary within specific embodiments. In another embodiment, transmission times are determined by comparing the local clock in the sensor 30 to four random numbers that are stored in memory within the sensor 30. These random numbers can be locally generated or downloaded from the host control unit 40 during programming. The random number approach essentially guarantees that the host control unit 40 will receive information even with data collisions occurring. In one embodiment, the sensors will transmit data several times a day according to the random numbers stored in memory.

The host control unit 40 may for example, only require that each sensor 30 check-in every so often, perhaps once a day. Therefore, if collisions were to occur or if messages from sensors 30 were not received for some other reason, by repeatedly sending the same status from each sensor 30 can insure that this single status will be received by the host control unit 40. To verify the integrity of the received data, a two-digit CRC-16 check sum can be added to the end of transmission.

In an embodiment, control unit 40 can operate with the estimated average power consumption as shown in Table 2, below. The calculation in Table 2 uses the currents shown in Table 1 for the percentages of time operating as shown in Table 2.

TABLE 2

| Device | Operating Current (μA) | % of Time Operating | Sleep current (μA) | % of Time Sleeping | Average current (μA) |
|---|---|---|---|---|---|
| MSP430F133 | 560 | 0.001 | 70 | 0.999 | 70.49 |
| MAX1473 | 6800 | 1 | 5.3 | 0 | 6800 |
| LCM-S01602DSFB (LCD) | 16300 | 0 | 0 | 1 | 0 |
| Valve Operation | 70000 | 0.00023 | 0 | 0.99977 | 16.1 |
| Total | | | | | 6886.59 |

As seen in Table 2, the MAX1473 receiver 26 is not operating all the time. The MAX1473 can contribute large amounts to average current usage; therefore, a reduction in the amount of time the MAX1473 is a wakeful state will result in a reduction of the average current use by the control unit 40. There are numerous timing configurations that can be employed to configure receiver 26 to be in sleep mode for varying amounts of time. The start up time for a MAX1473 receiver is 250 μsec. If the receiver 26 was configured to sleep for most of the time and only awake once every second for a short period of time similar to the processing element 42, this would result in an average current utilization for the receiver of 6.8 μA instead of 6800 μA and a total average current for the control unit of about 93.4 μA instead of 6886.59 μA, which is clearly a substantial savings. If the receiver 26 were in sleep mode 90% of the time and the wake mode 10% of the time, still only 68 μA would be required by the receiver instead of 6800 μA, which is still a very substantial savings in average current usage. There are numerous configurations for keeping different components of the control unit 40 in sleep mode for varying amounts of time.

Power for the Control Unit

Various embodiments for the control unit 40 can have a battery backup that can provide 3, 6 or 9 volts of power depending on the particular design. The batteries used can be either alkaline or rechargeable batteries such as those made from lithium. Main power for the control unit 43 can be supplied from numerous types of wall adapters 43 that can simply accept AC power from a wall outlet. The control unit 40 has a printed circuit board (PCB) that contains circuitry for the processing element 42 and other circuitry associated with the control unit 40.

Figure 6:
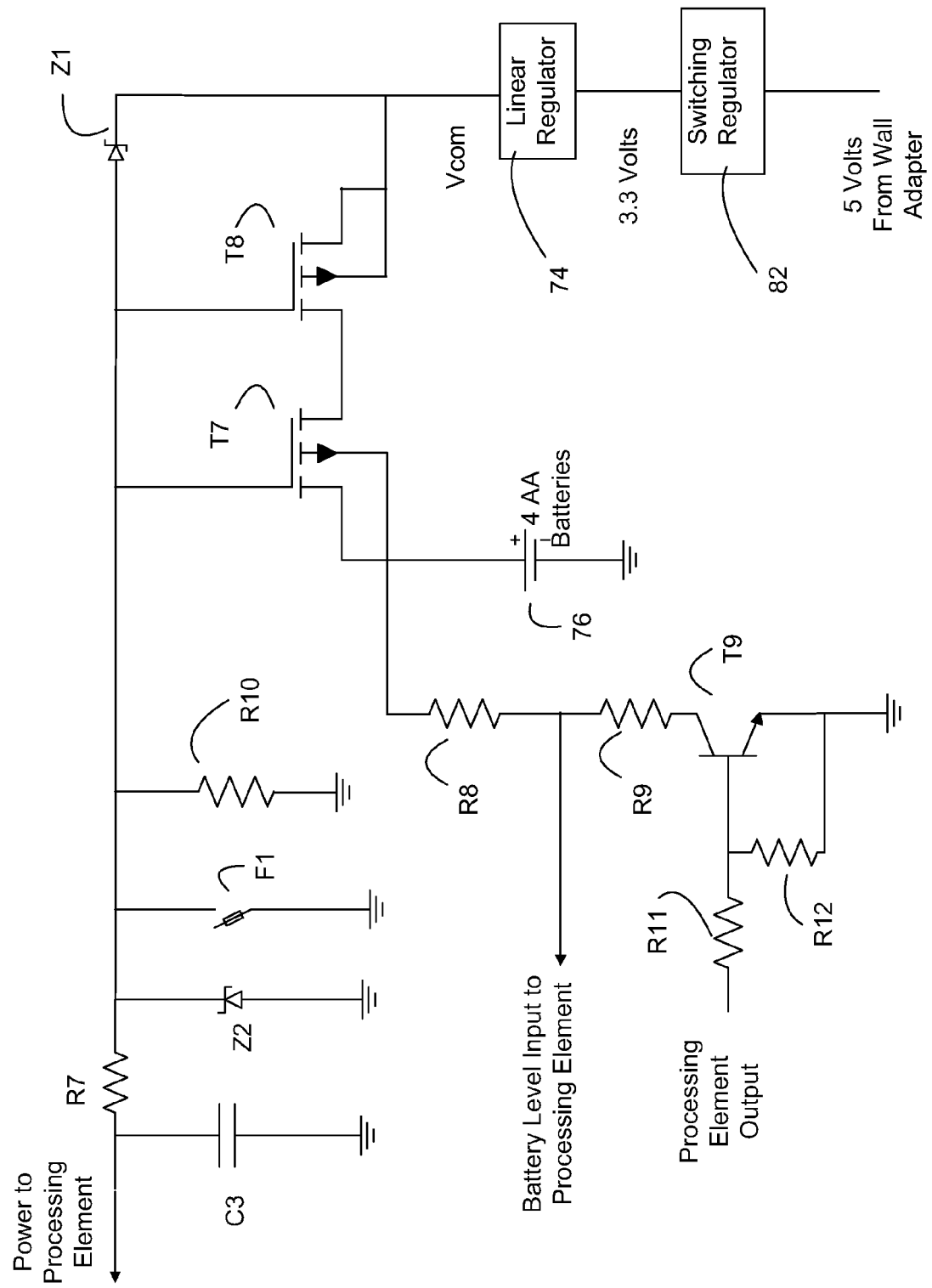
FIG. 6 is a schematic diagram of an example circuit used for the provision of power.

Referring to FIG. 6, control unit 40 is provided with overvoltage protection to prevent the voltage applied to circuits within the control unit 40 to rise beyond a certain level. In an embodiment for the control unit 40 will receive power during normal operation from a wall adapter. If brownouts, blackouts or a loss of power occurs, battery back-up power is provided. A wall adapter supplies 5 volt power to switching regulator 72. The switching regulator 72 takes the 5 volt input and outputs 3.3 volts that is used by a linear regulator 74 to create a constant, reliable value for $V_{com}$ that can be used by the remaining circuits with control unit 40. $V_{com}$ will be taken here as about 5 volts, although this can vary in accordance with differing embodiments and types of circuitry used.

In another embodiment, enhancement mode, p-channel MOSFETs T7 and T8 will provide isolation for the batteries if external power is available. In those embodiment using an external power supply such as $V_{com}$, zener diode Z1 will break down resulting in a logical high being applied to the gates of p-channel MOSFETS T7 and T8 ensuring that these transistors are turned off, not allowing batteries 76 to connect to the node at the anode side of zener diode Z1. If external power is removed, a logical low is applied to the gates of MOSFETs T7 and T8 turning these transistors on, thus, connecting batteries 76 to the anode side of zener diode Z1. The voltage at the anode side of zener diode Z1 is supplied through input protection resistor R7 as power to the Processing Element 42. Zener diode Z2 and capacitor C3 also provide input protection for processing element 42. Fuse F1 provides additional protection in case of current overload. Resistor R10 provides a predetermined resistance level between power and ground. The voltage at the anode side of zener diode Z1 is also supplied as power to the remaining circuit within the control unit 40. MOSFETs T7 and T8 have a very low voltage drop which results in a longer life for batteries 76. It should be noted that the foregoing is only an example and the different configuration are envisioned to provide isolation between battery backup circuits and wall adapter sources of power.

Still referring to FIG. 6, processing element 42 can periodically check the state of the batteries 76 to determine if the battery power is getting low by driving Processor Element Output to a logically high state through resistor R11 at the gate input to bi-polar transistor T9 to turn on transistor T9. The voltage drop across the collector-emitter of transistor T9 is known, therefore, using resistors R8 and R9 as a voltage divider allows the node between these resistors to be used as an input to processing element 42 to sample the states of the batteries 76. R12 provides a predetermined level of resistance between the gate of transistor T9 and ground. The relationship is illustrated in Equation 1 below with Vcpu being the voltage at the node between resistors R8 and R9, Vbat being the voltage of the batteries and Vce being the voltage drop across from the collector to the emitter of transistor T9.

$$Vcpu=(Vbat-Vce)*R9/(R8+R9) \quad \text{Equation 1}$$

Equation 1 can be rearranged to Equation 2 below that is the calculation that processing unit 42 makes in order to determine battery voltage.

$$(R8/R9+1)*Vcpu+Vce \quad \text{Equation 2}$$

The node between R8 and R9 is analyzed to determine the present battery voltage. This analysis can be in the form of direct analog comparisons used to set a flag or some other indication, or an analog to digital conversion (ADC) can take place of the voltage at the node between R8 and R9 and then analyzed. Using one of the MSP430 family produced by Texas Instruments® as processing element 42, such as the MSP430F133, is an example of a microcontroller that will provide an ADC internal reference voltage. This allows for the node between R8 and R9 to be directly connected to a pin on processing element 42 and internally routed to a 12 bit ADC. The ADC reference voltage is internally set to 2.5 volts. For example, if four new batteries each provide 1.6 volts, there would be a total of 6.4 volts. Therefore, according to Equations 1 and 2, with Vce at 0.05 volts and the internal ADC voltage for comparison set at 2.5 volts (e.g. Vcpu), for Vbat=6.4 volts, R8=1.54 R9. It should be noted that the foregoing is only an example. Different levels of battery power can be employed and various circuits can be used analyze the voltage at the node between R8 and R9.

In embodiments providing either a low power or sleep mode for the control unit 40, battery backup can provide over 4 weeks of power for control unit 40. It will be noted, many types of power provisions are possible and the foregoing is only an example.

Sensor

In certain particular embodiments, the sensor 30 will function to detect fluids, such as water. In other embodiments, the sensor 30 will be used to detect gaseous substances. The term "wired sensor" as used herein is any type of sensor system that is in communication with the control panel 40 (or similar device) through a wired interface. The term "wireless sensor" as used herein is any type of sensor system that is in communication with the control panel 40 (or similar device) without through a wireless interface.

Figure 4A:
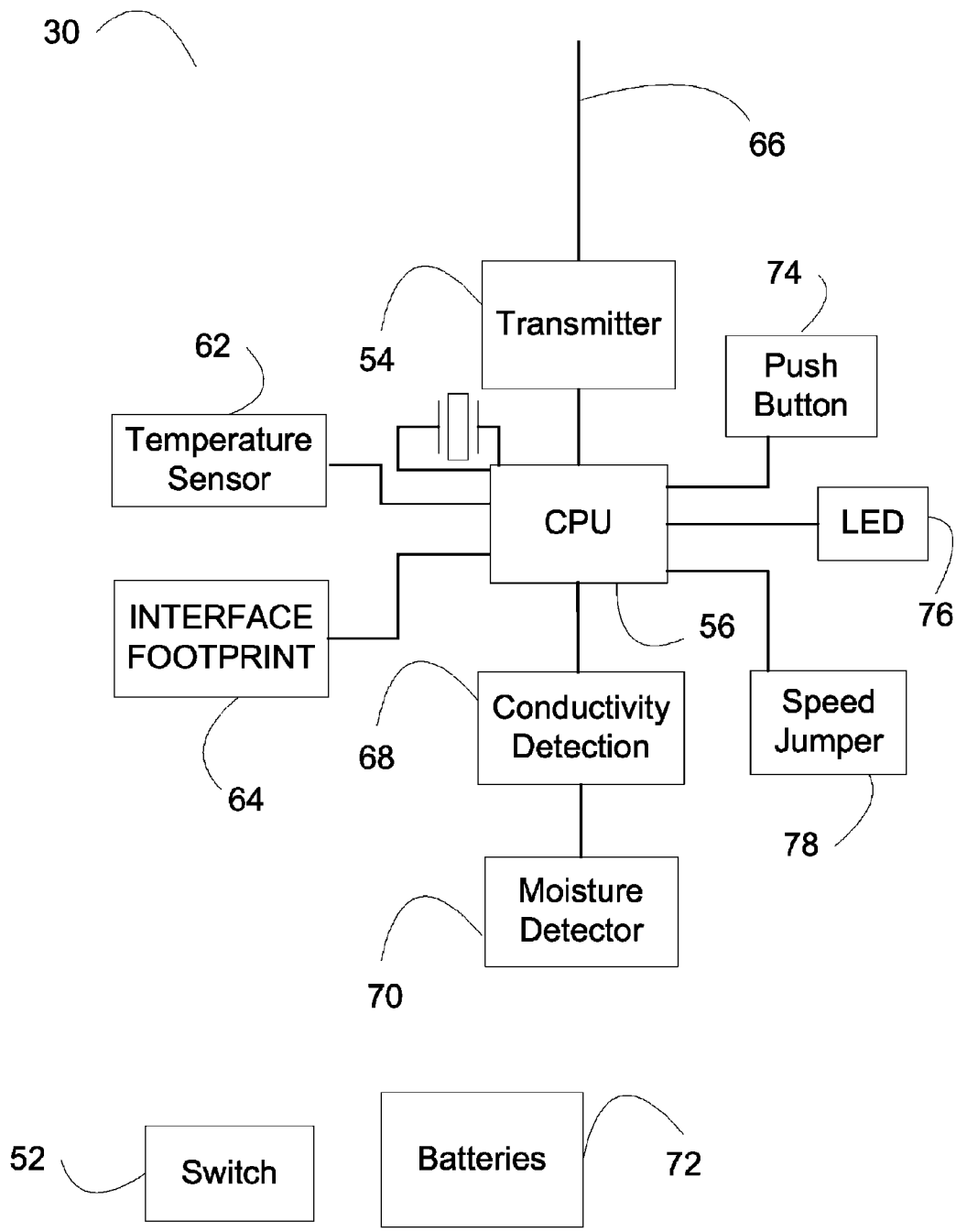
FIG. 4 is a block diagram for a leak detection sensor.

FIG. 4A is a block diagram for an embodiment of a wireless sensor 30 used for fluid detection. Embodiments having a sensor 30 configured to detect fluid can employ a moisture detector 70 and a mechanism for communicating the detection of moisture to the control unit 40. In an embodiment for a wireless sensor 30, the moisture detector 70 will generate a signal to report the detection of moisture so that a transmitter 54 can transmit messages to the control unit 40 via antenna 66. The message can provide information regarding the wireless sensor 30, for example the detection of a specific substance. Additional reports from sensor 30 can be made according to different embodiments including, but not limited to, low battery, current time, serial number or loss of wireless sensor connection 30. The wireless sensors 30 can communicate with the control unit 40 on a periodic basis, such as once every few days, once per day or many times per day.

In another embodiment, wireless sensors 30 can initialized through a direct, wired connection to the control unit 40 and programmed so that sensors 30 operate to interface wirelessly with the control unit 40 associated with that corresponding leak detection system 10 to the exclusion of any other control units or other wireless devices using the same frequency range. The sensor 30 is programmed by the control unit 40 while connected as a wired sensor 50 to exchange serial numbers, unique numbers, code words or encrypted words to allow identification as being part of the same system. The wired sensor 50 is then disconnected from the control unit 40 programmed and capable of interfacing with the control unit 40 in a wireless mode as a wireless sensor 30. The receiver 26 in the control unit 40 will ignore all signals from sensors 30 that do not have either serial numbers unique numbers, code words, encrypted words or some other identifying indicia programmed into or otherwise recognizable by the control unit 40.

In an embodiment, a wireless sensor 30 has a transmitter 54 with a line of sight range that can be configured to be in excess of 250 feet. The range of 250 feet is selected to be in conformance with title 15 of the FCC code. A range in excess of 450 feet with an initial drop off in signal strength occurring at 300 feet based on line of sight conditions outdoors is easily obtainable using conventional communications equipment. There are numerous power arrangements for sensors 30 to obtain this range. For example, using a 3 volt lithium ion battery or 2 standard AA batteries to achieve 3 volts could provide the necessary power. If the resulting range is in excess of that allowed under title 15 of the FCC code using the power from these batteries, the actual power delivered to the transmitter 54 can be "dialed down" using a resistor network so that 100% signal strength within a structure transmits as desired, or to be about 250 feet. In this manner, wireless sensors 30 will send an acceptable FCC signal during normal use.

Another embodiment will display the strength of detected by the receiver 26 within the control unit 40 for a transmitted signal from the sensor 30 during a set up mode for the sensor 30. Further embodiments provide for the system 10 to stay in the program mode if no sensors 30 have been programmed The sensors 30 can be configured will an internal time clock that allows the sensors 30 to keep time via the CPU 56.

Embodiments can be designed to provide power conversation yielding battery life of at least 4 years for a radio frequency (RF) wireless sensor 30. An embodiment can provide the sensors 30 with a sleep mode that can be employed to conserve power and be awake during predetermined intervals.

Another embodiment will have an interface footprint 64 that is used with sensor 30 during programming. The interface footprint 64 provides access to the internal memory of the sensor 30. There are various types of programming that can take place for sensor 30. The first type of programming takes place usually at the factory to provide initial programming of non-volatile memory within the sensor 30. In an embodiment a standard interface such as a JTAG type header will function as an interface footprint 64. It should be noted that a usage of a JTAG header is only an example and numerous types of connection devices can be employed in place of a JTAG header. An interface footprint 64 will enable initial programming of non-volatile memory within the sensor 30 so that basic functions can be performed. One such basic function is capability to interface with a control unit 40 through a hardwired connection to become part of a particular system 10 through programming at a later time. The programming that takes place later can use the same header (JTAG or other connection device) or another type of interface footprint can be provided for this purpose. In another embodiment, a 4 pin male or female connector forms at least part of the interface footprint 64 that is used for the hardwired mode interface with the control panel 40 in the later programming of the sensor 30. LED 76 is provided as an indicator that the sensor 30 is being programmed. LED 76 can be configured to illuminate or blink during the hardwired mode programming with control unit 40 or also with the initial programming.

Mechanical switch 52 can provide function such as power on or off test, or rest functions. Push Button 74 can provide multiple functions depending on the state the system 10 is on and on the manner push button 74 is used. In an embodiment, a single push of button 74 can signal the control unit to perform test related to status of that sensor 30 and/or multiple sensors within the system 10. These tests cans be any of various tests designed to check that one or more sensors have checked in using serial numbers or other identifying indicia, temperatures of on or more sensors 30 can be checked, voltage levels of one or more sensors, current sensor 30 status as wet or dry, communicating or proper functioning can be checked. If a leak indication is flashing on the sensor, embodiments can use a single press of push button 74 to clear the leak status and return to normal operation. Push button 74 can also function to be pressed and held down for a period of time such as a predetermined number of seconds to perform a function such as continuously sending a signal to the control unit 40. The signal strength can be measured and/or viewed on the display panel 32 of the control unit 40. Additional tests can be provided for conductivity detection, moisture detection or battery powers using either switch 52 or button 74 alone on in combination.

An embodiment will provide at least one sensor 30 with a speed increasing device. The speed increasing device will increase the periodic cycle of the sensor by a predetermined factor. For example, if a sensor 30 reports status to a control unit 40 every so often, the speed increasing device will increase the rate that status is report by a predetermined amount. In another embodiment, the speed increasing device increases the periodic cycle by a factor of 720. Other factors are also envisioned, such as anywhere from twice to several thousands times faster. Factors to be considered in speed increasing are the fundamental cyclic rate and the desired cycle rate.

In an embodiment, the sensors 30 are designed to be mounted in a manner that will detect small leaks. This could be achieved by mounting the sensor 30 directly on the floor. The sensors 30 can employ a probe originating from the sensor body in the form of a sensor wire. The probe could be stainless steel, or other conductive material, and will be attached to the floor to detect the presence of moisture. Prior art sensor designs required mounting on a wall board that left space under the sensor necessitating relatively large amounts of water or other fluid to accumulate before a leak is detected.

In an embodiment, the sensor 30 is powered by a 3 volt battery. The battery can be a lithium battery or 2 AA alkaline batteries. Sensors 30 can be provided with an LED indicator to display that a leak has been detected. A red Led can function well for this purpose; however, any color can be used. LEDs can also provide for indication that a low battery condition exists, and or that a test button has been pushed.

Figure 4B:
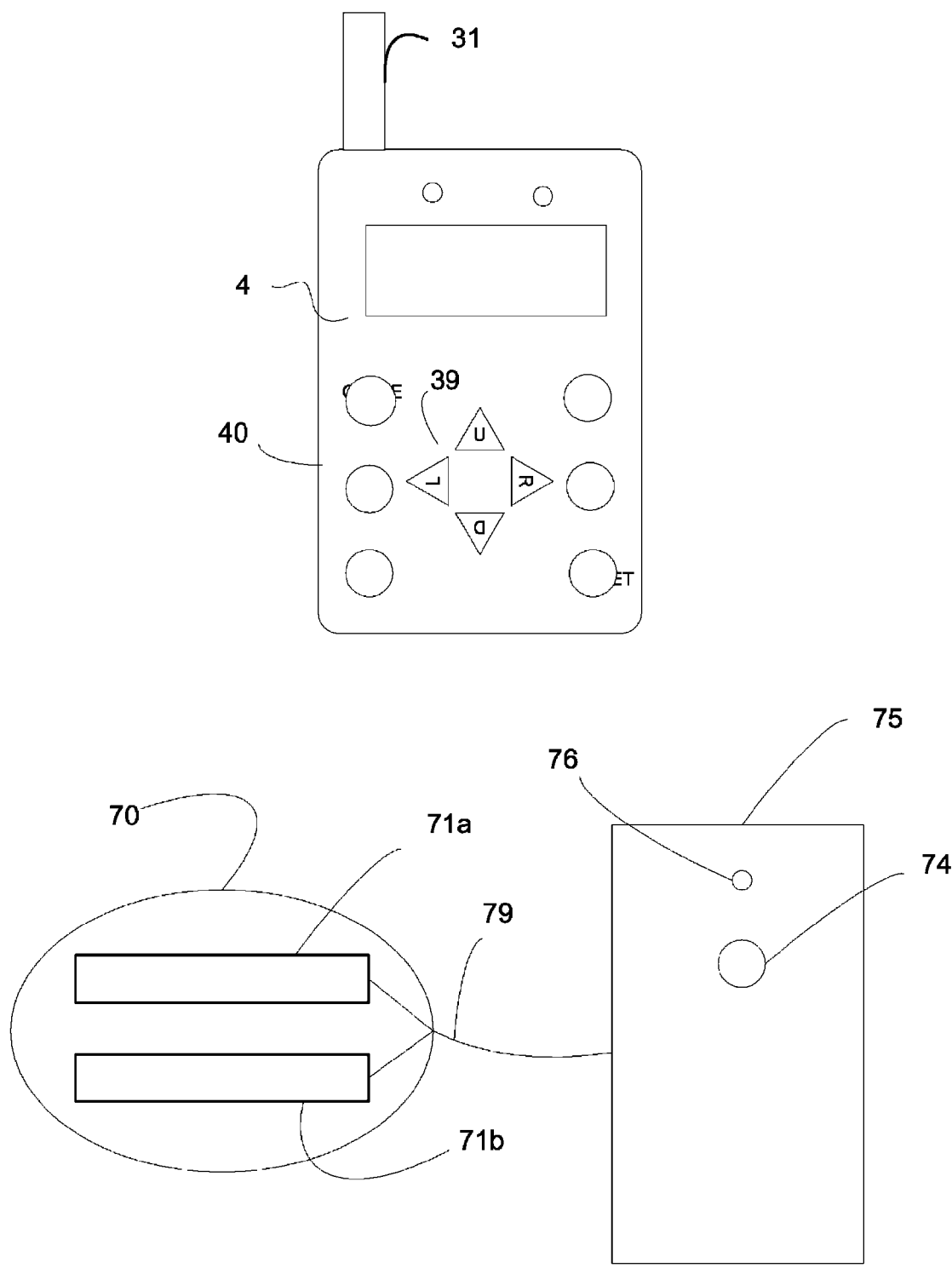

Various embodiments are envisioned for sensor 30 sizes and configurations. In one embodiment the body of the sensor 30 contains all the elements shown in FIG. 4A, including moisture detector 70 and batteries 72. In another embodiment as shown in FIG. 4B, moisture detector 70 is separate from the remaining portions of sensor 30. One embodiment for a moisture detector 70 illustrated in FIG. 4b can detect the presence of a fluid substance by measuring resistance between conductive plates 71a, 71b. As seen in FIG. 4b, moisture detector 70 is about 2" wide by 3" length by about ½ to 1" in height. Different embodiments can have varying sizes and the foregoing is simply for example. A small size for the sensor 30 or the moisture detector 70 allows inconspicuous placement in areas, such as behind toilets.

Microcontroller

Referring to FIG. 4A, sensor 30 can contain a CPU 56 used to control the functions performed by the various blocks shown in FIG. 3. CPU can be a controller, microcontroller or microprocessor. An embodiment uses a low power microcontroller selected from the MSP430 family made by Texas Instruments® as CPU 56. The MSPx20xx series of microcontrollers features ultra-low power, mixed signal controllers. Within the MSPx20xx series of microcontrollers, the MSP430x20x1 features a versatile analog comparator. An embodiment employs the TI MSP430F2001 microcontroller as the CPU 56 for sensor 30 as shown in FIG. 3. The TI MSP430F2001 has an internal clock source that can change frequencies quickly allowing the TI MSP430F2001 to switch between different modes, such as a low-power mode and a normal operating mode. The TI MSP430F2001 also has an internal comparator with an 8-to-1 multiplexer that can detect the thresholds on up to eight of its GPIO pins.

In an embodiment, a comparator within CPU 56 (such as that within a TI MSP430F2001 microcontroller) can be used to detect moisture and/or low battery condition. In other embodiments, another device can function as a comparator or mechanism that can be used for comparisons. The device for performing comparisons can be internal or external to CPU 56.

The CPU 56 for sensor 30 can have a programmable internal memory. Various types of memory are envisioned, such as RAM, ROM non-volatile RAM, EEPROM or various types of flash memory. The internal memory may require a minimum voltage in order to be programmed and the voltage requirements for programming of the internal memory to sensor 30 should be taken into account. An embodiment will provide basic programming to sensor 30 at the factory and additional programming to sensor 30 in a configuration mode using a wired interface to control unit 40. Other embodiments will program internal memory to sensor 30 in a wireless mode. It should be noted that the memory does not need to be contained on the CPU 56 to sensor 30 and various design alternatives for implementing memories and the programming of these memories will be readily apparent to those skilled in the art. In various embodiments, the internal memory within sensor 30 will contain data that is pre-programmed into the internal memory either at the time of manufacturing or during initialization of the system in order to store serial number or other types of data that is always desired to be contained on the sensor 30; therefore, non-volatile memory is desired for this type of data.

The TI MSP430F2001 microcontroller has 1 KB of internal flash for program memory, 256 bytes of flash memory is used for data and 128 bytes of RAM memory. Internal flash memory can require a minimum battery voltage to guarantee proper programming operation, currently on the order of 2.2 volts to be programmed; however, this can easily change as flash memory evolves. In embodiments using only batteries, a battery voltage of at least 2.2 volts may not be guaranteed. Accordingly, it may not be desirable to write the internal flash memory by CPU 56 during regular operation in embodiments having only battery power. In those embodiments using batteries to power sensor 30, the data flash memory can at the time of manufacturing store serial number or other types of data desired to be stored in a non-volatile memory. In a TI MSP430F2001 microcontroller, segment A of data flash can be used to store calibration data for CPU 56. It should be understood that using the TI MSP430F2001 microcontroller as the CPU for sensor 30 CPU is only an example and that other types of microcontrollers and processors are envisioned as being capable as CPU 56 for sensor 30.

Embodiments that seek to minimize power consumption can operate CPU 56 sensor 30 at varying frequencies. In an awake or active mode, the CPU 56 can run at a first higher frequency and in a sleep or low power mode the CPU 56 can run at a second slower frequency. Various alternative designs are possible for the amount of time that the CPU 56 spends awake versus the amount of time it spends in a sleep mode. Embodiments are envisioned in which CPU 56 does not spend a large percentage of time in an awake or active mode. Numerous microcontrollers and processors can function as the CPU for sensor 30. Various tradeoffs can be made for power conservation. Lower frequencies and larger amounts of time in sleep or low power modes will reduce power consumption. Higher frequencies and greater amounts of time in active or awake mode will consume more power. The use of higher frequencies in wake or active modes can be offset by a greater proportion of time in sleep or low power modes. Also, greater periods of awake or active modes can be used if the frequencies for these modes are not too high and still achieve a substantial power savings.

An embodiment seeking to minimize power employs a TI MSP430F2001 microcontroller as the CPU 56 for sensor 30 running at 1 MHz in active mode and at about 100 KHz in a Low Power Mode 1 (LPM1) mode. To economize on power, the CPU 56 does not spend a large percentage of time in active mode; therefore, power consumption is not increased drastically if the CPU 56 uses a faster speed in this mode. To increase the accuracy and reliability of the baud rates used for transmission, the CPU 56 in active mode can run at a frequency that is calibrated. Embodiments using a TI MSP430F2001 microcontroller as the CPU 56 have calibrated frequencies for 1 MHz, 8 MHz, 12 MHz, and 16 MHz. It should be noted that the use of the TI MSP430F2001 microcontroller as the sensor CPU 56 and the frequencies of operation are examples and that other types of microcontrollers and processors using different frequencies are envisioned as also being suitable for the CPU 56 for sensor 30.

In order to conserve power, the CPU 56 can employ lower power modes if not in an active mode. Embodiments using battery power for the sensor 30 can conserve power by placing CPU 56 in active modes as infrequently as necessary and allowing CPU 56 to be in a lower power consuming sleep or non-active modes as frequently as possible.

The TI MSP430F2001 microcontroller has internal counters that can be used for keeping track of time. In LPM1 mode these counters are still clocked and can be programmed to provide an interrupt to CPU 56 and to bring CPU 56 out of a low-power mode. An embodiment will have sensors 30 send packets to the control unit 40 periodically, such as once daily.

In one embodiment, moisture detector 70 will detect the presence of water once the resistance between the plates 71a, 71b drops to a predetermined value. In another embodiment, the resistance value will drop to about 100K ohms for a leak to be indicated. In another embodiment the resistance between the plates will have to drop to a particular value for a predetermine length of time, for example 5 seconds. Other embodiments will require a longer period of time at a lower resistance between the plates 71a, 71b until the presence of water indicating a leak has been determined. Once a leak is determined, then an alarm is set, either audible or visual. It should be understood using conductive plates 71a, 71b is only an example and that there exist numerous other moisture detectors that can be used with sensor 30.

In another embodiment, each sensor 30 in system 10 is individually programmed with a hard wired connection to the host controller. The following is an example of data that can be programmed into each of the sensors 30. A product identification code comprising one or more bytes, a serial number comprising one or more bytes, a location identification comprising one or more bytes and/or bit random numbers comprising one or more bytes to provide for intended time-of-day check-in. The above data can be stored in flash memory so the microcontroller will retain this data with or without batteries.

The sensors 30 can check in with the control unit 40 at periodic intervals, such as once a day, many times a day, once a week or other intervals. Each sensor 30 can send one or more messages containing current status information for that sensor 30. The messages broadcast to the control unit 40 can contain a unique identifier for 30 the sensor 30 such as a serial number or indicate which zone is reporting status. The sensors 30 can broadcast messages indicating either a wet or dry status. Embodiments can have sensors 30 broadcast their batteries voltage levels. Other embodiments will have sensors 30 send messages to the control unit 40 that indicate the time on an internal clock to that sensor 30. Yet other embodiments can broadcast error detection features, such as check sums, cyclic redundancy checking (CRC) or parity.

The sensors 30 can be configured to send any or all of the foregoing status information periodically. Periodic transmission of messages creates a robust system allowing for the possibility that one message may not be received correctly. The control unit 40 can simply disregard any additional messages after successfully receiving a status check in.

Other embodiments can provide for the failure of a sensor 30 to communicate with the control unit 40 and set an alarm state set. An alarm state can result in visual or audio alarm or both. The control unit 40 can provide an audio and/or visual confirmation of sensor tests. Varying embodiments of the control unit 40 can allow for visual and/or audio confirmation of successful programming of sensors 30, the deletion of sensors, the addition of sensors, adding/deleting service reminders on the control panel. Additional embodiments can have the control unit 40 enabled to provide an alert of an alarm states for the system 10. An alarm state can include but is not limited to: low battery voltage for the control unit 40 or one of the sensors 30, poor signal quality from one or more sensors 30, a wet sensor 30 indicating a water leak, a communication failure between components within system 10, a failure of one of the sensors 30 or a failure in the sensor 30 connection. The alert to an alarm state can be provided through speaker 24, Display Panel 32 or both. The number of sensors 30 used within system 10 can vary widely. Embodiment can have several dozen sensors 30 within a system 10 with the only limitations being the complexity of the electronics used.

Another embodiment can indicate the state of a power failure on the control panel. In one embodiment, a power failure state can be set if one or more sensors 30 has power that is below a nominal value needed to insure proper functioning over a period of time. Proper functioning of a sensor 30 requires that moisture detector 70 be functioning and the ability to communicate with the control unit 40. Other embodiments can also include other components in system 10 that require power indicate the state of a power failure on the control panel, such as actuator 20 or the battery back-up to the control unit 40.

In still another embodiment, states are provided that will indicate basic problems with system features. For example, the attempted programming of a sensor 30 has failed, the connection to valve 12 is not good or failed, no sensors are programmed as yet or a service reminder or other preventative maintenance issue is active. There are numerous mechanisms that can be used to alert to any of these system issues including audible or visual alters.

The sensor 30 can typically operate within a temperature range of about 1° C. to 60° C. to detect water leaks for indoor applications. While the electronics in the sensor 30 can operate outside this range, freezing temperatures would cause water to solidify and it would be difficult to detect water that is frozen. System 10 can be provided with temperature sensors to close valve 12 if the temperature drops below a predetermined threshold; also, an alarm can be indicated. Temperatures above 60° C. can clearly represent a dangerous situation and an alarm can be provided for such an occurrence. Alarms can be audible or visual or both.

The sensor 30 can be powered using any of a variety of power considerations. An embodiment can provide 3 volts using by either 2 AA alkaline batteries or a single 3V lithium battery. The batteries can easily be made to be field replaceable.

Most water leaks are the result of dripping from appliances, toilets, sinks etc. and the damage that occurs from then takes place over a period of time; therefore there is very little need to respond to leaks instantaneously. Embodiments employing controllers such as the MSP430 processor from Texas Instruments and transmitters such as the MAX1472 from Maxim that provide a standby mode with very low current drains can easily be used to detect leaks. Controllers and transmitters in standby mode will have current drain on the order of micro amps resulting in very little battery drain. Therefore to conserve battery life, the microprocessor/controller and transmitter will spend a majority of their time in a low-power, sleep-type mode and will be activated only periodically to check status. The period of activity can vary widely according to different embodiments. In one embodiment, the microprocessor/controller will be in a sleep/stand-by mode most of the time and be activated about once every second. For example, the MSP430 microcontroller has an extreme low-power timer mode when using 32.768 kHz watch crystal. Even during status checks, the current drain is still typically below 200 micro amps using a provided internal RC clock. Using standby modes, the only significant power usage will be in the milliamp range during transmitter or LED operation. Based on these numbers, a standard two AA battery pack will have an estimated battery life on the order of two to four years before battery replacement is required.

The MSP430 microcontroller will have a maximum standby current drain at 25° C. of less than 50 uA. The MSP430 microcontroller will have a maximum full current drain at 25° C. of less than 5 mA. This provides a sensor 30 that can easily employ two AA Alkaline or one 3V lithium battery and not require new batteries for over a year.

Sensor 30 can detect a low battery condition and send an alert of this low battery condition to the control unit 40. In an embodiment, once the sensor 30 detects a low battery condition, a flag will be set indicating the low battery condition and transmitted to the control unit 40. Transmission of a low battery condition to the control unit 40 can occur during regularly scheduled status updates or be given a priority level providing for quicker status reports to the control unit 40. If the leak is detected during a low battery condition, the leak will have a higher priority than the low battery condition. The sensor 30 program returns to a normal mode once the batteries are changed or the system is reset through a reset device such as a pushbutton.

Figure 7:
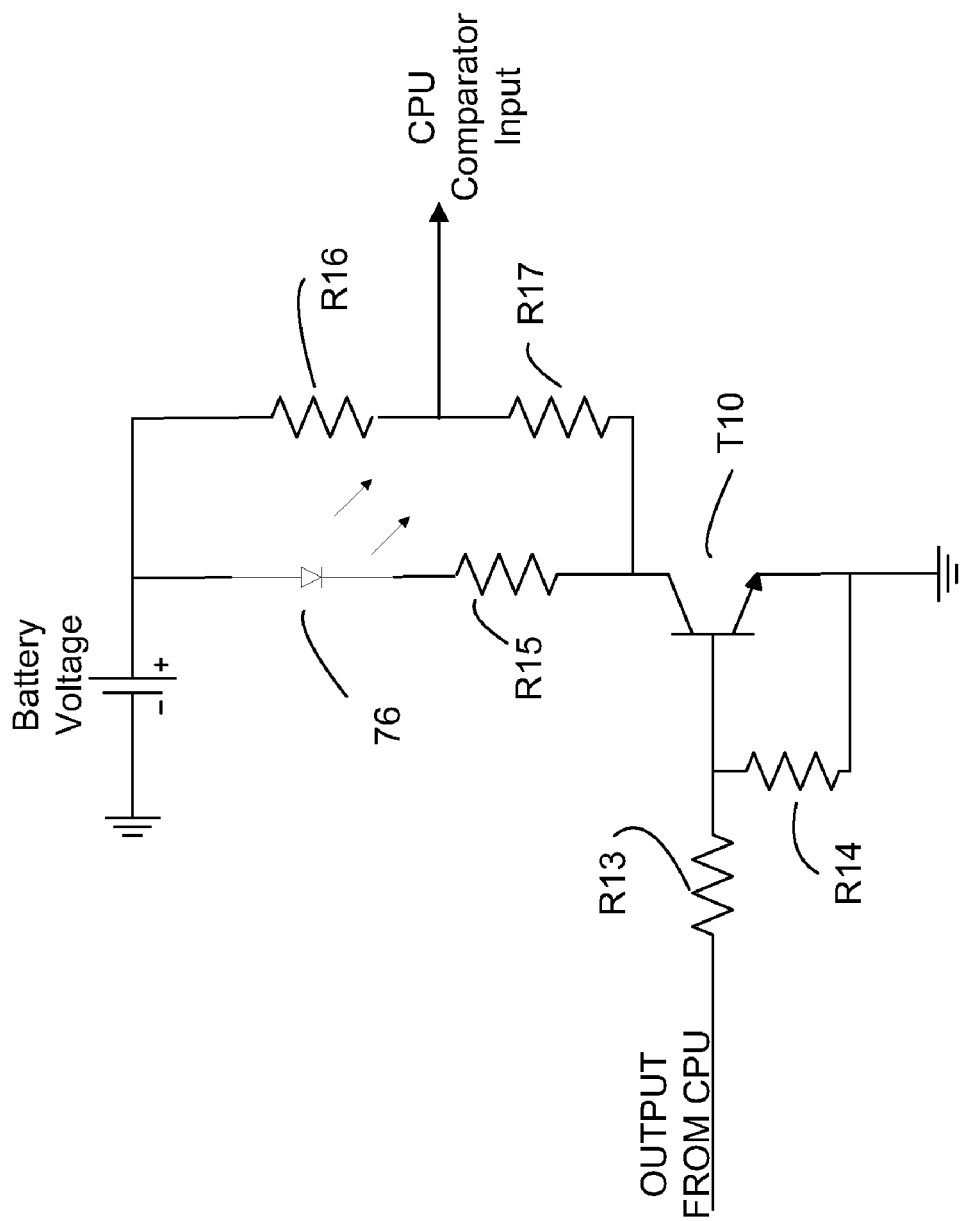
FIG. 7 is a schematic diagram of an example circuit for low battery detection.

FIG. 7 is a schematic drawing of an example circuit that can be used for low battery voltage detection. The CPU 56 (e.g. microcontroller) can measure the battery voltage on a periodic basis and if it is below a threshold send a battery low voltage message to the control unit 40 on the next transmission. The periodic basis can be once a day or more or less frequently. To measure battery voltage using the example circuit shown in FIG. 7, CPU 56 will output a signal to turn on transistor T10. Transistor T10 is an NPN bi-polar transistor. R13 is placed between the gate of transistor T10 and the output pin to CPU 56 to isolate the output pin and provide a voltage divider in conjunction with R14. The output from CPU 56 causes transistor T10 to turn on which substantially places the collector of transistor T10 at a ground potential, turning on LED 76.

LED 76 can be turned on for a short period of time to provide a load current and then the voltage should be measured. Turning on LED 76 will also substantially short the side of resistor R17 connected to the collector of transistor T10 to ground. Thus, resistors R16 and R17 create a voltage divider that can be used to measure the battery voltage at the node CPU comparator input.

Figure 8:
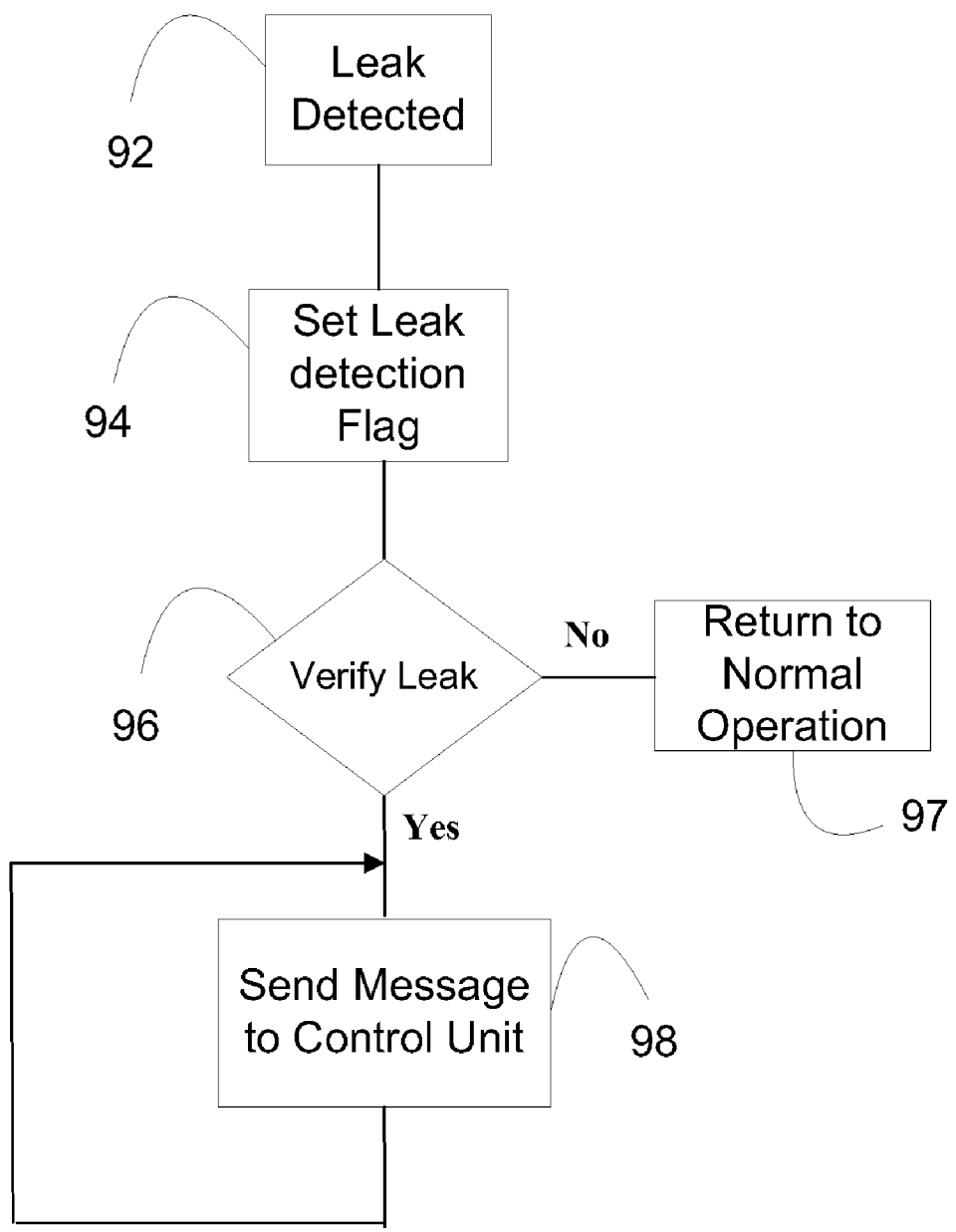
FIG. 8 is flow diagram illustrating steps taken for leak detection and verification.
Figure 9:
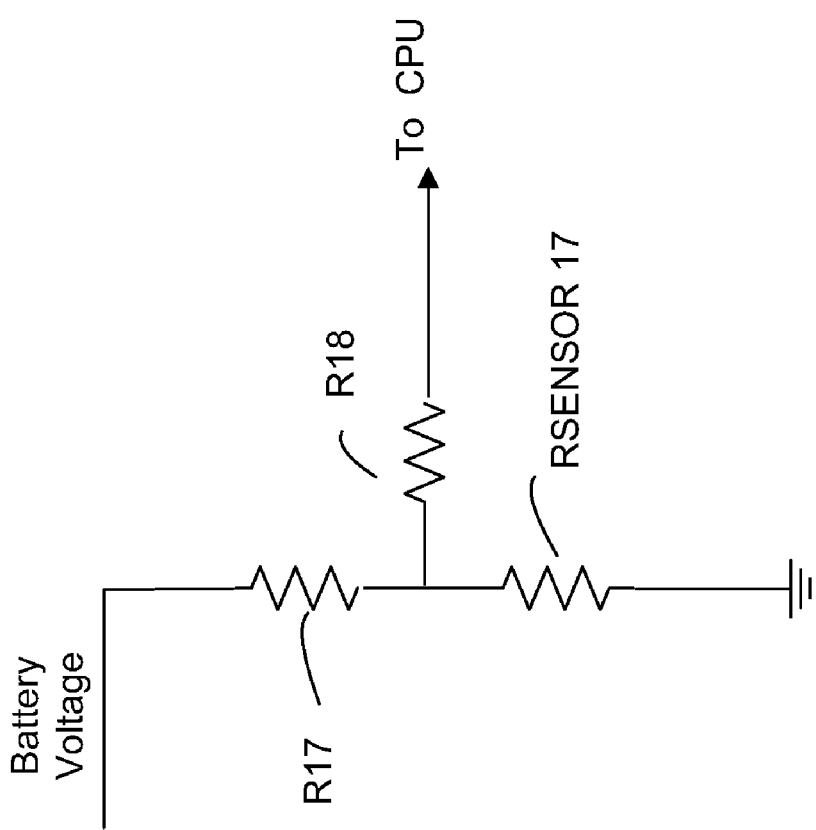
FIG. 9 is an example schematic diagram of a circuit used for leak detection.

Equation 3 illustrates the basic reading that CPU 56 makes at CPU Comparator Input shown in FIG. 7.

$$Vcpu=(Vbat-Vce)*R17(R16+R17) \qquad \text{Equation 3}$$

Where Vce is the voltage across the transistor T10 and Vcpu is the voltage sensor on the CPU Comparator Input shown in FIG. 8. Equation 3 can be rearranged to form shown in Equation 4 below. This is the calculation that CPU 56 makes in order to determine the current battery voltage.

$$Vbat=(R16/R17+1)*Vcpu+Vce \qquad \text{Equation 4}$$

In an embodiment, two AA batteries are used to provide up to 3.2 volts of power. The CPU 56 will perform the calculation of Equation 4 and compare the result with a predetermined threshold. In one embodiment that threshold could be less than about 1.6 volts. In another embodiment that threshold is less than about 2.3 volts. Embodiments using thresholds of less than 1.6 volts, greater than 2.3 volts or thresholds between these values are also envisioned.

Different embodiments can have varying battery supply voltages. There exist numerous circuit designs and chip selections that allow for different voltages to be used. Therefore, the foregoing should not be viewed as limiting but only as an example.

In another embodiment, the circuitry used for power generation and low battery voltage detection is protected from current running in the wrong direction and reverse voltages if the user should put the batteries in the reverse direction.

Wireless Communications

In an embodiment, sensor 30 communicates with host control unit 40 through an ultra-high frequency (UHF) on an unlicensed frequency band. In one embodiment the frequency band can be near 433 MHz; which would be roughly equivalent to Region 1 of the industrial, scientific and medical (ISM) radio bands. The International Telecommunication Union (ITU) provides regulations that create three regions within the world for managing the radio spectrum. Region 1 ISM radio band comprises the areas of Europe, Africa, the Middle East west of the Persian Gulf including Iraq, the former Soviet Union and Mongolia. For example, the use of Region 1 ISM in the Americas would be an unlicensed frequency band. Other embodiments could use frequency bands different from around 433 MHz. Other regions of the world may not allow use of Region 1 ISM and other frequency bands that are unlicensed would have to be used. It should be noted that numerous frequency bands can be employed, and embodiments using these alternative frequency bands are envisioned.

In another embodiment, UHF communications takes place using an amplitude shift keyed (ASK) low-powered transmitter 54 that operates on an unlicensed frequency band. The transmitter 54 on the sensor 30 can run directly from battery at 433 MHz. In another embodiment, a transmitter, for example a MAX1472 by Maxim®, can be used to transmit data up to 100 kbps. It will be understood by those skilled in the art that numerous transmitter/receiver combinations can be used and that the transmission capabilities of these combinations can vary. It should be noted that although a MAX1472 by Maxim can transmit at speeds up to 100 kbps that such high speed is not necessary for the transmitter on the sensor 30 to successfully communicate with the receiver on the control unit 40.

Antenna 67 can be built into the main printed circuit board (PCB) on the sensor 30 or antenna 67 can be external.

Another embodiment uses a transmitter 54, such as a MAX1472 by Maxim within the sensor 30 in combination with a receiver, such as a MAX1473 by Maxim in the main control unit 40 to perform communications between the sensor 30 and the control unit 40. These devices provide low cost, low parts count, low overall power consumption, and very low standby power. It should be understood that other devices can be used as a transmitter for the sensor 30 and a receiver for the control unit 40. An external antenna can be used with a MAX1473 to provide better sensitivity and coverage.

The transmission frequency of the transmitter will be on the order of less than about 434 MHz and remain within an ISM band. The Transmission distance will be about 250 feet.

In another embodiment, the frequency of transmission between the sensor 30 and the control unit 40 will 433.92 MHz within an ISM band with a distance of about 250 feet by having the maximum transmitter power that is limited in accordance to FCC part 15.

Embodiments can also be devised for sensor 30 wherein transmitter 54 employs a vertical polarization.

In another embodiment the data format use by the sensor 30 in transmitting data to the control unit 40 will included transmissions from the sensor 30 that are 12 bytes long and have data comprising the format of: a Product ID; a serial number; a sensor location; a status indication that indicates at least if sensor 30 is operating normally or is wet; and an error code.

In another embodiment the transmissions from the sensor 30 to the control unit 40 include a data format having at least one start bit, 8 data bits, 1 stop bit and the sensor transmits data to the control unit 40 at a baud rate of 9600 with a burst mode that completes transmission of data having the foregoing format in under 15 ms.

In another embodiment the sensors 30 each have an identification code and a serial number programmed into a flash memory within the sensors 30 by the control unit 40.

The priority of message can be varied among differing embodiments. In an embodiment, the priority of messages will be as follows with the lower number being a higher priority: (1) Sensor wet; (2) Battery voltage low; (3) Test mode and (4) Normal operation.

In the foregoing embodiments, only one way communication between the sensors 30 and control unit 40 was discussed. Embodiments are also envisioned wherein communications between the sensors 30 and the control unit 40 takes place using bi-directional communication. There are many conventional transceiver elements that can be used in place of the transmitter on the sensor 30 and the receiver 26 on the control unit 40. These transceiver elements could be selected to satisfy low power requirements previously discussed for the transmitter on the sensor 30 and the receiver 26 on the control unit 40.

Leak Detection

One embodiment for a moisture detector 70 illustrated in FIG. 4b can detect the presence of a fluid substance by measuring resistance between conductive plates 71a, 71b. The moisture detector 70 has two metal plates 71a, 71b that are spaced apart to detect water leaks. The two plates 71a, 71b within the moisture detector 70 normally have a high resistance between them, such as a resistance in the mega ohm range. If the two plates come into contact with a common pool of water, the resistance between the two plates drops substantially, on the order of about few kilo ohms. In an embodiment, the plates are made from stainless steel, although other materials can be used for the plates. The moisture detector 70 operates by applying a small DC electric current, in the micro amp range, into one of two flat stainless steel plates that is separated from the other plate, which is connected to ground, by an air gap. If the area around the plates 71a, 71b is dry, then the space between the plates creates a very high resistance that appears as an open circuit. However; if the area around the two plates 71a, 71b comes into contact with water, then the conductivity of the water reduces the resistance across the powered plates; which is detected by the sensor 30 indicating a water leak.

In an embodiment, the moisture detector 70 uses as plates 71a, 71b two 3"×0.5" stainless steel metal plates with a 0.25" air gap between them. The plates 71a, 71b are enclosed in a plastic moisture detector housing 78 and connected to the remaining electronics for sensor 30 within sensor housing 75 using a two-conductor wire 79. The two-conductor wire 79 will attach to a printed circuit board (not shown) within sensor housing 75. One of plates 71a, 71b is connected to a ground on the printed circuit board (not shown) within sensor housing 75. The other of plates 71a, 71b is connected through a resistor to an input on the microcontroller/CPU 56. One of the comparator input pins for the microcontroller on the sensor 30 is used to measure the resistance across the plates to sensor 30. The resistor provides input isolation for the microcontroller.

In another embodiment, the input on the microcontroller 56 is isolated using a 2.2 K resistor. The 2.2 K resistor provides isolation to the input of the microcontroller 56 such that once contact with water lowers the resistance across the plates no harm will occur to the input on the microcontroller.

In another embodiment, the resistance formed by the space between the plates 71a, 71b of moisture detector 70 creates high input impedance having a resistance in the mega-ohm range. The high input impedance persists as long as the plates are not exposed to water or some other type of conductive surface. Once the plates of the sensor are exposed to a conductive surface the resistance of the high input impedance is reduced and once the resistance is reduced to about a 100K threshold, a leak is determined to be detected.

In another embodiment, the high impedance input that exists between the plates 71a, 71b (absent the plates being exposed to a conductive surface) creates the possibility that an external voltage spike (or a short of some sort) could lower the input impedance and be misinterpreted as a leak. In order to minimize false triggers, processing element 42 within control unit 40 can verify that the lowered resistance (seen as the leak condition) persists over a period of time. This period of time can be a number of clock cycles for the internal clock to either the sensor 30 or the control unit 40, or a number of seconds. In one embodiment, the lowered input impedance must persist for 5 seconds before it is determined that a leak exists. In another embodiment, the input impedance must be lowered to a threshold value, such as 100K ohms for a predetermined period before a leak is determined. In yet another embodiment, a lowering of the input impedance must be a fractional portion of the high input impedance for a predetermined period of time.

In an embodiment, if a sensor 30 is not programmed from the host control unit various actions can take place. A timer can be employed to periodically to wake up the processing element 42 and an LED can flash at a predetermined rate.

System 10 can be pre-programmed to run according to a predetermined schedule. The processing element 42 on the control unit 40 will spend most of its time in a low power environment that is not completely off but actually a sleep mode. In this low power sleep mode, a crystal or oscillator (such as an internal watch crystal) operates a timer internal to the control unit 40. In an embodiment, the timer will wake up the processing element 42 about once a second. Various embodiments will have different durations of sleep modes or different periods for waking up the processing element 42. Certain embodiments will have processing element 42 awoken more than once a second, while other embodiments will allow processing element 42 to sleep for multiple second periods. During wakeful periods, the processing element 42 can update its internal time clock, check to see if any of sensors 30 are reporting a wet status, check to see if a status is expected or any of a number things. Expected status can be determined by processing element 42 by looking at an internal clock, by a timer apparatus within the control unit 40 or by having processing element 42 expect status to be reported for each of the sensors 30 that are associated with that control unit 40. Status reported from each of the sensors 30 can include such items as: wet/dry conditions; error reporting status; battery voltage or other status condition related to the sensor 30. Additionally, bi-directional communication modes can have the control unit 40 initiate status checks to verify correct functioning, battery voltages and communications with various components within system 10, such as sensors 30, valve 12 or other system components. Once processing element 42 performs any of a selection of predetermined functions, the processing elements will return to a sleep mode. It should be noted that if control unit 40 is plugged into a constant power source, such as a wall outlet, that sleep mode can be omitted and processing element 42 can constantly check status of various system components as power savings would not be a major consideration. Other embodiments will have the control unit 40 delivered with a constant power source such as a wall outlet and a battery backup power source. In those embodiments in which the control unit has a constant power source and a battery backup power source, a sleep mode can be used only if the constant power source fails, or sleep mode can be used all the time.

In the event that a sensor 30 detects a leak, several actions can take place. One of the possible actions is that the sensor 30 can immediately transmit a message or series of messages to the control unit 40 that a leak has been detected.

Another possible series of actions is illustrated in the flowchart shown in FIG. 8. Once the sensor 30 detects a leak condition, the CPU 56 performs Leak Detected 92 which results in Leak Detection Flag 94 being set. Once the leak detection flag has been set, then CPU 56 will perform Verify Leak 96 to verify that the leak condition persists over a predetermined period of time or a predetermined number of cycles of the internal sensor clock. In one embodiment, the verification can take place over the next four cycles. Other embodiments using more or fewer cycles can also be used. Also, numerous time periods can be used to verify the leak actually exists. If a leak is not verified, the CPU 56 will perform a Return To Normal Operation 97 that resets the leak detection flag and enables the sensor 30 once again begin normal operation. If a leak is verified, the CPU will perform Send Message to Control Unit 98 that instructs the sensor 30 to transmit a leak detection message to the controller unit 40. To enhance the probability that the message transmitted to the control unit 40 is properly received, Send Message to Control Unit 98 can send repeated messages. In one embodiment, after detecting a leak has been verified, Send Message to Control Unit 98 will continually send message for a period of time and then send messages at regular intervals. In another embodiment, Send Message to Control Unit 98 continues to send information regarding the leak about once a second for about 16 seconds and then sends messages regarding the leak at regular intervals. In another embodiment, Send Message to Control Unit 98 will transmit a leak detection message to the control unit 40 once every a number of seconds. In another embodiment, Send Message to Control Unit 98 will have the sensor 30 continue to send leak information messages for regular intervals and after a predetermined period of time send leak information at the regular status update intervals. Send Message to Control Unit 98 will have continue to send leak related messages until an action is taken to reset the sensor 30 by push button or other mechanism or until the leak condition is alleviated.

In another embodiment the sensor 30 will have an LED that can flash in the event that a leak is detected. In one embodiment, the LED can start flashing at periodic rates to conserve battery power. The LED can be turned on for a second or a fraction of a second and turned off for a number of seconds to conserve battery power. In another embodiment, the LED can be turned on for about a hundred milliseconds and turned off for about 3 seconds.

In another embodiment, the LED is turned off while the sensor 30 is transmitting leak messages to the control unit 40 to conserve battery power. The sensor 30 can have a reset mechanism, such as a push button, and continue to flash the LED while not transmitting and turn the LED off while transmitting until the push button is pressed to reset the sensor 30 back to normal mode. If a low battery condition is detected in this embodiment, the sensor 30 can be programmed to turn the LED off to allow the sensor 30 to continue transmitting leak detection messages to the control unit 40 at the regular intervals.

Pushbutton Operation

Sensor 30 can be provided with an electro-mechanical device that will provide functions such as resetting sensor 30. Embodiments can be designed for the electro-mechanical device to be a pushbutton device having allowing actuation by mechanically depressing the pushbutton device. The movement of the pushbutton device engages an electrical circuit internal to the sensor 30 to perform a reset of the sensor 30.

In another embodiment, the sensor 30 will have a reset device, such as an electro-mechanical pushbutton device, that can perform multiple functions. One function that the sensor 30 can be programmed to perform is to depress the pushbutton or other electro-mechanical and release it within 2 seconds, in which case the leak detection flag is cleared and the sensor 30 returns to normal operation.

Another embodiment will have a reset device that can perform multiple functions. Here, the sensor 30 can be programmed so that an electro-mechanical device such as a pushbutton or other device can provide an input to perform multiple functions. One function could be the reset function previously described. Another function is the mechanism could allow the sensor 30 to go into a test mode. For example, sensor 30 can be programmed so that if the reset device (such as a push button or other device) is held down for a predetermined period of time that a particular action will take place. In one embodiment the reset device can be depressed for five seconds and released and the sensor will go into a test mode or possibly a status mode. The test mode could have the sensor 30 perform various functions such as run internal test, or transmit test messages to the control unit 40. The control unit 40 can be programmed to anticipate test messages and, once received, the control unit 40 can verify proper functioning of the sensor 30. The sensor can also be programmed to transmit test messages periodically and the robustness of the entire system can be verified by witnessing the results of the sensor 30 test at the control unit 40. For example, the sensor 30 can transmit test messages every one, two, three, four or five seconds for of period of one or several minutes. The control unit can be programmed to receive the test messages and verify the results. A status mode can provide testing of the sensor 30 operation as well as power level status and other status items relevant to the sensor 30. After completing the transmitting of test or status information, the sensor can then automatically go back into a normal operating mode.

Internal Clock

The sensor can be provided with an internal clock useful for several functions. One function for the internal clock would be for timing of the sensor 30. In limited function embodiments where the timing of sensor 30 is the only function necessary, an internal clock would not require a high degree of accuracy, resulting in fewer and less expensive parts.

Other embodiments may require that the clock for sensor 30 be synchronized with an internal clock within the control unit 40 to provide enhances programming features within the system 10. These embodiments would require more accuracy in the internal clock to the sensor 30.

Sensor Speed Up Test Mode

Another embodiment could have a sensor 30 alter the rate at which status and/or test modes are performed and reported to the control unit 40. This function can be performed be a switch like mechanism provided either internally or externally to the sensor 30 housing that can activate a speed up test mode, a jumper or pins located on the pc board internal to the sensor 30 housing that when shorted can provide a speed up test mode or a software control can be provided that can be accessed by the control unit. A speed up test mode can perform test and status checks for the sensor 30 that would normally by done over a longer period of time. For example, the sensor 30 can have a speed up test mode that reduces a daily cycle by a factor of 720; therefore, instead of performing and transmitting test and status reports over 24 hours, the sensor 30 would complete the test and/or status checks in only 2 minutes. Once the speed up mode is deactivated, the sensor 30 can return to a normal hour cycle. Many rates of reporting can be used and numerous multiplying factors for speed up can also be used.

Programming

Programming of system 10 can take place in a variety of ways according to differing embodiments. In one particular embodiment, an initial state is entered upon powering up of the system 10. The initial state can have display panel 32 indicate that no sensors 30 have yet been programmed and also provide an indication for the next step that needs to be performed by the user; for example, the system 10 can have display panel 32 indicate which button to press. The display panel 32 could show the message "AquaGate, 0 sensors programmed, press <menu> to set up system". Performing the indicated action will enter into a setup menu or the like. In the setup menu, the display panel 32 can provide various indications to enter time or date. A cursor can be provided on the display panel allowing the setting of hour, minute, am/pm, year, etc. with the user pressing enter to set.

In another embodiment, the menu button 47 on the display panel 32 can also provide for programming of the system 10 by simply depressing the menu button 47 and using a cursor or other pointing device to navigate through the information presented on the display panel 32. A zone can de designated for each of the sensors 30 providing a name, number or icon for each sensor 30 either from menu selection by scrolling to desired name, number or icon or allowing the user to input of a name from the control panel 4. The sensor is interfaced with the control panel either through wireless communications or a hardwired interface by inserting a wire into a port. An indication is given that programming of each sensor 30 is taking place and that programming is complete. This initialization process will take place for each sensor 30.

The display panel 32 can provide a menu for programming of service reminders. Selection of service reminders can be entered in terms of days, weeks or month between service reminder notifications and simply pressing enter to confirm.

The addition or deletion of sensors can be done using similar programming techniques described above or provided using a menu selection on the display panel 32.

The programming of sensor communications can be accomplished as a sequential programming selection, as a selection of a menu shown on the display panel or other similar mechanisms. Sensor communications can indicate the zone where the leak has been detected and that valve 12 has been closed. Low Battery is another sensor communications that can be accomplished indicating the sensor by name or zone that needs its battery replaced. If no signal from a sensor 30 has been received within a predetermined time period, then this can be indicated on the display panel 32 as no signal from either the name or zone, such as "No Signal Hot Water Heater. Please Check".

The foregoing description details embodiments that are intended as examples. Therefore, the foregoing embodiments should not be viewed as limiting and the scope of the invention should be measured from the appended claims.

The invention claimed is:

1. A system for controlling the flow of a substance comprising:
   a valve coupled to an intake and an outtake for the substance;
   a rotatable portion coupled to the valve that selectively places the valve into an open position that allows flow of the substance from the intake to the outtake or a closed position that prevents the substance from flowing from the intake to the outtake;
   at least one sensor located remotely from the valve that can detect the presence of the substance;
   a control unit configured to receive signals from the sensor;
   an actuator coupled to the control unit by at least a pair of wires that are coupled to each the actuator and the control unit according to polarity, wherein the actuator will selectively control the valve to the open position or the closed position in response to at least one signal from the control unit placed upon at least one wire of the pair of wires;
   at least one mechanical stop contained within the actuator configured to produce a stall signal after a 90 degree movement of the rotatable portion, the stall signal being indicative of the rotatable portion reaching either the open position or the closed position, the stall signal being generated due to increased current draw on the actuator upon completion of said 90 degree movement; and
   a valve control mechanism within the control unit configured to respond to an instruction to place the valve in either the open position or the closed position and place the signal on the pair of wires to control the valve to the open position or the closed position as dictated by the instruction;
   wherein upon reception from the sensor that the substance has been detected, the valve control mechanism will generate the instruction to placed the valve into the closed position.

2. The leak detection system of claim 1 further comprising an activating mechanism on the control unit that selectively generates the instruction to place the valve in either the open position or the closed position.

3. The leak detection system of claim 1 further comprising an attachment mechanism that is fixedly attached to both the actuator and the valve, the attachment mechanism holding the actuator and the valve in an aligned configuration with respect to each other such that substantially all slack is removed in connections between the attachment mechanism, the actuator and the value.

4. The leak detection system of claim 3 wherein the attachment mechanism is removable such that the rotatable exterior portion is exposed once the attachment mechanism is removed allowing for manual control of the rotatable exterior portion of the valve.

5. The leak detection system of claim 1 wherein the sensor is coupled to the control unit via a wireless interface.

6. The leak detection system of claim 5 wherein the control unit further comprises at least one wired input for the sensor, the wired input providing a bidirectional interface between the control unit and the sensor.

7. The leak detection system of claim 6, wherein the sensor is programmed by the control unit over the bidirectional interface to function only with the control unit via the wireless interface to the exclusion of any other control units.

8. The leak detection system of claim 5, wherein the sensor provides to the control unit via the wireless interface a status of the sensor to the control unit through wireless communication, wherein the status is for at least one of: wet or dry condition; normal functioning; or battery voltage status.

9. The leak detection system of claim 1, wherein the valve is a low torque valve.

10. The leak detection system of claim 9 wherein the low torque valve can be either opened or closed using less than about 10 inch-pounds of torque up to an internal pressure within the valve of up to about 150 pounds per square inch.

11. The leak detection system of claim 10 wherein the actuator has a high gear ratio.

12. The leak detection system of claim 1, further comprising a flow monitor interface on the control unit capable of accepting an input from a flow monitor and determining if a summarized use of the substance through a conduit exceeds at least one predetermined parameter.

13. The leak detection system of claim 1 wherein the control unit instructs the valve actuator to close and then reopen the valve on a periodic basis.

14. The leak detection system of claim 1, further comprising a flow monitor interface on the control unit capable of accepting an input from a flow monitor and determining if a summarized use of the substance through a conduit exceeds at least one predetermined parameter.

15. A water leak detection system comprising:
   at least one sensor that can detect the presence of a substance;
   a wireless transmitter coupled to the sensor to transmit detection of the substance by the sensor;
   a central control unit coupled to a receiver configured to can receive signals from the wireless transmitter;
   a low torque ball valve;
   a valve actuator configured to control the low torque ball valve to an open position and a closed position in response to at least one signal from the control unit;
   at least one mechanical stop contained within the valve actuator configured to produce a stall signal after a 90 degree movement of the low torque ball, the stall signal being indicative of the low torque ball reaching either the open position or the closed position, the stall signal being generated due to increased current draw on the valve actuator upon completion of said 90 degree movement; and
   a leak response mechanism within the control unit that is configured to respond to the reception from the wireless transmitter that water has been detected by controlling the valve actuator to close the low torque ball valve.

16. The leak detection system of claim 15 further comprising an attachment mechanism that is fixedly attached to both the actuator and the valve, the attachment mechanism holding the actuator and the valve in an aligned configuration with respect to each other such that substantially all slack is removed in connections between the attachment mechanism, the actuator and the value.

17. The leak detection system of claim 16 wherein the attachment mechanism is removable such that the rotatable exterior portion is exposed once the attachment mechanism is removed allowing for manual control of the rotatable exterior portion of the valve.

18. The leak detection system of claim 15 wherein the control unit further comprises at least one wired input for the sensor, the wired input providing a bidirectional interface between the control unit and the sensor, wherein the sensor is programmed by the control unit over the bidirectional interface to function only with the control unit via the wireless interface to the exclusion of any other control units.

19. The leak detection system of claim 15, wherein the sensor provides to the control unit via the wireless interface a status of the sensor to the control unit through wireless communication, wherein the status is for at least one of: wet or dry condition; normal functioning; or battery voltage status.

20. The leak detection system of claim 15 wherein the low torque valve can be either opened or closed using less than about 10 inch-pounds of torque up to an internal pressure within the valve of up to about 150 pounds per square inch and the actuator has a high gear ratio.

* * * * *